US008740701B2

(12) United States Patent
Berry et al.

(10) Patent No.: US 8,740,701 B2
(45) Date of Patent: Jun. 3, 2014

(54) CONTROLLING WAGERING GAME SYSTEM AUDIO

(75) Inventors: Robert G. Berry, Elmhurst, IL (US); Timothy T. Gronkowski, Chicago, IL (US); Eric M. Pryzby, Skokie, IL (US); Paul J. Radek, Naperville, IL (US); Charles A. Richards, Buffalo Grove, IL (US); Steven J. Zoloto, Highland Park, IL (US)

(73) Assignee: WMS Gaming, Inc., Waukegan, IL (US)

( * ) Notice: Subject to any disclaimer, the term of this patent is extended or adjusted under 35 U.S.C. 154(b) by 993 days.

(21) Appl. No.: 12/797,756

(22) Filed: Jun. 10, 2010

(65) Prior Publication Data

US 2010/0317437 A1 Dec. 16, 2010

Related U.S. Application Data

(60) Provisional application No. 61/187,134, filed on Jun. 15, 2009.

(51) Int. Cl.

| | |
|---|---|
| ***A63F 13/00*** | (2006.01) |
| ***G07F 17/32*** | (2006.01) |
| *G07F 17/34* | (2006.01) |

(52) U.S. Cl.

CPC .............. *G07F 17/32* (2013.01); *G07F 17/326* (2013.01); *G07F 17/323* (2013.01); *G07F 17/3225* (2013.01); *G07F 17/3272* (2013.01); *A63F 2300/6063* (2013.01); *A63F 2300/6081* (2013.01)

USPC .............................................. 463/35; 463/16

(58) Field of Classification Search

CPC ... G07F 17/32; G07F 17/326; G07F 17/3272; G07F 17/323; G07F 17/3225; A63F 2300/6063; A63F 2300/6081

USPC ..................................................... 463/16, 35

See application file for complete search history.

(56) References Cited

U.S. PATENT DOCUMENTS

| | | | |
|---|---|---|---|
| 5,259,613 | A | 11/1993 | Marnell, II |
| 5,483,631 | A | 1/1996 | Nagai et al. |

(Continued)

FOREIGN PATENT DOCUMENTS

| | | |
|---|---|---|
| EP | 1439507 | 7/2004 |
| WO | WO2004086320 | 10/2001 |

(Continued)

OTHER PUBLICATIONS

U.S. Appl. No. 13/204,225, filed Aug. 5, 2011, Caporusso, Vito M., et al.

(Continued)

*Primary Examiner* — William H McCulloch, Jr.

(74) *Attorney, Agent, or Firm* — DeLizio Gilliam, PLLC

(57) ABSTRACT

A wagering game system and its operations are described herein. In embodiments, the operations can include determining audio playlists from a plurality of independent wagering game applications ("applications"). The audio playlists can include multiple sound content that is activated contemporaneously on a wagering game machine for each of the applications. The operations can further include determining sound classes assigned to the sound content and determining, from prioritization rules, priority values for the sound classes. The operations can further include comparing the priority values and generating sound balancing priorities for the sound content based on the comparison of the priority values. The operations can also include dynamically balancing the sound content, as presented on audio production devices, based on the sound balancing priorities.

24 Claims, 12 Drawing Sheets

(56) References Cited

U.S. PATENT DOCUMENTS 5,633,933 A 5/1997 Aziz
6,040,831 A 3/2000 Nishida
6,081,266 A 6/2000 Sciammarella
6,146,273 A 11/2000 Olsen
6,647,119 B1 11/2003 Slezak
6,652,378 B2 * 11/2003 Cannon et al. .................. 463/20
6,656,040 B1 * 12/2003 Brosnan et al. ................. 463/16
6,832,957 B2 * 12/2004 Falconer ......................... 463/20
6,843,723 B2 1/2005 Joshi
6,848,996 B2 * 2/2005 Hecht et al. ..................... 463/35
6,860,810 B2 * 3/2005 Cannon et al. .................. 463/20
6,939,226 B1 9/2005 Joshi
6,960,136 B2 11/2005 Joshi et al.
6,968,063 B2 * 11/2005 Boyd ............................. 381/57
6,972,528 B2 12/2005 Shao
6,974,385 B2 12/2005 Joshi et al.
6,991,543 B2 1/2006 Joshi
7,082,572 B2 7/2006 Pea et al.
7,112,139 B2 9/2006 Paz Barahona et al.
7,156,735 B2 * 1/2007 Brosnan et al. ................. 463/16
7,208,669 B2 * 4/2007 Wells et al. ..................... 84/601
7,228,190 B2 6/2007 Dowling et al.
7,355,112 B2 * 4/2008 Laakso ........................... 84/615
7,364,508 B2 4/2008 Loose et al.
7,367,886 B2 5/2008 Loose et al.
7,449,839 B1 11/2008 Chen et al.
7,479,063 B2 1/2009 Pryzby et al.
7,594,851 B2 * 9/2009 Falconer ......................... 463/20
7,666,091 B2 2/2010 Joshi et al.
7,682,249 B2 3/2010 Winans et al.
7,806,764 B2 * 10/2010 Brosnan et al. ................. 463/20
7,811,170 B2 10/2010 Winans et al.
7,901,291 B2 * 3/2011 Hecht et al. ..................... 463/42
7,901,294 B2 * 3/2011 Walker et al. ................... 463/42
7,951,002 B1 * 5/2011 Brosnan .......................... 463/42
8,029,363 B2 * 10/2011 Radek et al. .................... 463/35
8,100,762 B2 * 1/2012 Pryzby et al. ................... 463/25
8,113,517 B2 * 2/2012 Canterbury et al. ...... 273/148 B
8,167,723 B1 * 5/2012 Hill et al. ........................ 463/42
8,184,824 B2 * 5/2012 Hettinger et al. ............... 381/77
8,414,372 B2 * 4/2013 Cannon et al. .................. 463/16
8,506,399 B2 * 8/2013 Pryzby et al. ................... 463/35
8,613,667 B2 * 12/2013 Brunell et al. .................. 463/40
8,622,830 B2 * 1/2014 Radek ............................. 463/35
2002/0010018 A1 1/2002 Lemay et al.
2002/0055978 A1 5/2002 Joon-Boo et al.
2002/0077170 A1 * 6/2002 Johnson et al. ................. 463/16
2002/0142825 A1 * 10/2002 Lark et al. ....................... 463/16
2002/0160826 A1 10/2002 Gomez et al.
2003/0007648 A1 1/2003 Currell
2003/0017865 A1 1/2003 Beaulieu et al.
2003/0064804 A1 * 4/2003 Wilder et al. ................... 463/35
2003/0064808 A1 * 4/2003 Hecht et al. ..................... 463/42
2003/0073489 A1 * 4/2003 Hecht et al. ..................... 463/35
2003/0073490 A1 * 4/2003 Hecht et al. ..................... 463/35
2003/0073491 A1 * 4/2003 Hecht et al. ..................... 463/35
2003/0114214 A1 * 6/2003 Barahona et al. ............... 463/20
2003/0130033 A1 7/2003 Loose
2003/0132722 A1 7/2003 Chansky et al.
2004/0072610 A1 4/2004 White et al.
2004/0142747 A1 * 7/2004 Pryzby ............................ 463/35
2004/0160199 A1 8/2004 Morgan et al.
2004/0209692 A1 10/2004 Schober et al.
2005/0026686 A1 * 2/2005 Blanco ............................ 463/35
2005/0032575 A1 * 2/2005 Goforth et al. .................. 463/35
2005/0043090 A1 2/2005 Pryzby et al.
2005/0054440 A1 3/2005 Anderson et al.
2005/0054441 A1 * 3/2005 Landrum et al. ................ 463/35
2005/0054442 A1 * 3/2005 Anderson et al. ............... 463/35
2005/0077843 A1 4/2005 Benditt
2005/0116667 A1 6/2005 Mueller et al.
2005/0128751 A1 6/2005 Roberge et al.
2005/0164785 A1 7/2005 Connelly
2005/0164786 A1 7/2005 Connelly
2005/0164787 A1 7/2005 Connelly
2005/0164788 A1 7/2005 Grabiec
2005/0174473 A1 8/2005 Morgan et al.
2005/0239545 A1 10/2005 Rowe
2005/0239546 A1 * 10/2005 Hedrick et al. ................. 463/29
2005/0248299 A1 11/2005 Chemel et al.
2005/0275626 A1 12/2005 Mueller et al.
2005/0277469 A1 12/2005 Pryzby et al.
2005/0282631 A1 12/2005 Bonney et al.
2006/0009285 A1 1/2006 Pryzby et al.
2006/0022214 A1 2/2006 Morgan et al.
2006/0046829 A1 3/2006 White
2006/0076908 A1 4/2006 Morgan et al.
2006/0244622 A1 11/2006 Wray
2006/0253781 A1 11/2006 Pea et al.
2006/0287037 A1 * 12/2006 Thomas .......................... 463/16
2006/0287081 A1 * 12/2006 Osawa ............................ 463/35
2007/0004510 A1 1/2007 Underdahl et al.
2007/0008711 A1 1/2007 Kim
2007/0032288 A1 2/2007 Nelson et al.
2007/0036368 A1 2/2007 Hettinger et al.
2007/0111776 A1 5/2007 Griswold et al.
2007/0155469 A1 * 7/2007 Johnson .......................... 463/17
2007/0155494 A1 * 7/2007 Wells et al. ..................... 463/35
2007/0185909 A1 * 8/2007 Klein et al. ................ 707/104.1
2007/0189026 A1 8/2007 Chemel et al.
2007/0191108 A1 * 8/2007 Brunet De Courssou et al. ............................... 463/42
2007/0218970 A1 9/2007 Patel et al.
2007/0218974 A1 9/2007 Patel et al.
2007/0219000 A1 9/2007 Aida
2007/0291483 A1 12/2007 Lys
2007/0293304 A1 12/2007 Loose et al.
2008/0009347 A1 * 1/2008 Radek ............................. 463/35
2008/0039213 A1 2/2008 Cornell et al.
2008/0070685 A1 3/2008 Pryzby et al.
2008/0094005 A1 4/2008 Rabiner et al.
2008/0113715 A1 5/2008 Beadell et al.
2008/0113796 A1 5/2008 Beadell et al.
2008/0113821 A1 5/2008 Beadell et al.
2008/0139284 A1 * 6/2008 Pryzby et al. ................... 463/20
2008/0161108 A1 7/2008 Dahl et al.
2008/0176647 A1 7/2008 Acres
2008/0188291 A1 * 8/2008 Bonney et al. .................. 463/25
2008/0194319 A1 * 8/2008 Pryzby et al. ................... 463/25
2008/0214289 A1 * 9/2008 Pryzby et al. ................... 463/25
2008/0231203 A1 9/2008 Budde et al.
2008/0234026 A1 * 9/2008 Radek ............................. 463/16
2008/0288607 A1 11/2008 Muchow
2008/0309259 A1 12/2008 Snijder et al.
2009/0009997 A1 1/2009 Sanfilippo et al.
2009/0170597 A1 7/2009 Bone et al.
2009/0197673 A1 8/2009 Bone et al.
2009/0206773 A1 8/2009 Chang
2009/0270167 A1 10/2009 Ajiro et al.
2009/0298579 A1 12/2009 Radek et al.
2009/0318223 A1 12/2009 Langridge et al.
2010/0022298 A1 1/2010 Kukita
2010/0022305 A1 1/2010 Yano
2010/0029385 A1 2/2010 Garvey et al.
2010/0031186 A1 2/2010 Tseng et al.
2010/0075750 A1 3/2010 Bleich et al.
2010/0113136 A1 5/2010 Joshi et al.
2010/0171145 A1 7/2010 Morgan et al.
2010/0213876 A1 8/2010 Adamson et al.
2010/0234107 A1 9/2010 Fujimoto et al.
2010/0277079 A1 11/2010 Van Der Veen et al.
2010/0309016 A1 12/2010 Wendt et al.
2010/0317437 A1 * 12/2010 Berry et al. ..................... 463/35
2011/0035404 A1 2/2011 Morgan et al.
2011/0045905 A1 2/2011 Radek
2011/0050101 A1 3/2011 Bailey et al.
2011/0070948 A1 3/2011 Bainbridge et al.
2011/0118018 A1 5/2011 Toyoda
2011/0190052 A1 8/2011 Takeda et al.
2012/0009995 A1 1/2012 Osgood
2012/0040738 A1 2/2012 Lanning et al.
2012/0129601 A1 5/2012 Gronkowski et al.

(56) References Cited

U.S. PATENT DOCUMENTS

| | | | | |
|---|---|---|---|---|
| 2013/0184078 | A1 | 7/2013 | Brunell et al. | |
| 2013/0310178 | A1 * | 11/2013 | Pryzby et al. | 463/35 |

FOREIGN PATENT DOCUMENTS

| | | |
|---|---|---|
| WO | WO2004014501 | 2/2004 |
| WO | WO2004075128 | 9/2004 |
| WO | WO2004075129 | 9/2004 |
| WO | WO-2005113089 | 12/2005 |
| WO | WO-2005114598 | 12/2005 |
| WO | WO-2005117647 | 12/2005 |
| WO | WO-2006017444 | 2/2006 |
| WO | WO-2006017445 | 2/2006 |
| WO | WO-2006033941 | 3/2006 |
| WO | WO-2006039284 | 4/2006 |
| WO | WO-2006039323 | 4/2006 |
| WO | WO-2006125013 | 11/2006 |
| WO | WO2007022294 | 2/2007 |
| WO | WO-2007022343 | 2/2007 |
| WO | WO2007061904 | 5/2007 |
| WO | WO-2007133566 | 11/2007 |
| WO | WO-2008057538 | 5/2008 |
| WO | WO-2008063391 | 5/2008 |
| WO | WO-2008137130 | 11/2008 |
| WO | WO-2009054930 | 4/2009 |
| WO | WO2010048068 | 4/2010 |
| WO | WO2011005798 | 1/2011 |
| WO | WO2011014760 | 2/2011 |
| ZA | 20041110 | 8/2005 |

OTHER PUBLICATIONS

"PCT Application No. PCT/US10/41112 International Search Report", Sep. 2, 2010 , 11 pages.
"PCT Application No. PCT/US10/43886 International Search Report", Sep. 16, 2010 , 12 pages.
"US Appl. No. 13/094,560 Office Action", Mar. 30, 2012 , 13 pages.
"US Appl. No. 13/094,701 Office Action", Mar. 27, 2012 , 26 pages.
"US Appl. No. 13/094,811 Office Action", Apr. 3, 2012 , 16 pages.
"U.S. Appl. No. 12/965,749 Final Office Action", Apr. 22, 2013 , 30 Pages.
"U.S. Appl. No. 13/094,811 Office Action", Jun. 21, 2013 , 19 pages.
U.S. Appl. No. 12/860,467, filed Aug. 20, 2010, Radek, Paul J.
U.S. Appl. No. 12/965,749, filed Dec. 10, 2010, Brunell, Edward G., et al.
U.S. Appl. No. 12/971,544, filed Dec. 17, 2010, Brunell, Edward G., et al.
U.S. Appl. No. 13/094,701, filed Apr. 26, 2011, Brunell, Edward G., et al.
U.S. Appl. No. 13/094,811, filed Apr. 26, 2011, Brunell, Edward G., et al.
U.S. Appl. No. 13/094,560, filed Apr. 26, 2011, Brunell, Edward G., et al.
U.S. Appl. No. 13/109,427, filed May 17, 2011, Brunell, Ed et al.
"U.S. Appl. No. 13/204,225 Office Action", Jun. 22, 2012 , 23 pages.
"PCT Application No. PCT/US10/43886 International Preliminary Report on Patentability", May 3, 2012 , 4 pages.
"U.S. Appl. No. 12/971,544 Final Office Action", Mar. 14, 2013 , 38 pages.
"U.S. Appl. No. 13/204,225 Office Action", Feb. 27, 2013 , 19 pages.
Gusella, Riccardo et al., "An Election Algorithm for a Distributed Clock Synchronization Program", *Berkley* http://www.eecs.berkeley.edu/Pubs/TechRpts/1986/CSD-86-275.pdf Dec. 1985 , 19 pages.
"U.S. Appl. No. 12/860,467 Office Action", Jan. 17, 2013 , 16 pages.
"U.S. Appl. No. 12/965,749 Office Action", Nov. 8, 2012 , 30 pages.
"U.S. Appl. No. 12/971,544 Office Action", Nov. 6, 2012 , 43 pages.
"U.S. Appl. No. 13/094,701 Final Office Action", Nov. 28, 2012 , 14 pages.
U.S. Appl. No. 14/080,272, filed Nov. 14, 2013, Brunell, Edward G., et al.
"U.S. Appl. No. 12/965,749 Office Action", Dec. 17, 2013 , 35 Pages.
"U.S. Appl. No. 13/094,560 Office Action", Dec. 6, 2013 , 9 Pages.
"U.S. Appl. No. 13/204,225 Final Office Action", Sep. 25, 2013 , 16 Pages.
"U.S. Appl. No. 13/388,118 Office Action", Oct. 11, 2013 , 9 Pages.
"Coyote Moon", *IGT* http://web.archive.org/web/20131213220054/http://media.igt.com/marketing/Promotionalliterature/GamePromolit_111E3-29BC7.pdf 2005 , 2 pages.
"Elvis Little More Action", *24Hr-Slots* http://www.24hr-slots.co.uk/WagnerWorks/Elvis_ALMA.html Sep. 5, 2009 , 4 pages.
"U.S. Appl. No. 13/094,811 Final Office Action", Dec. 24, 2013 , 15 Pages.
NYPHINIX13, , "Star Wars Cloud City Slot Bonus—IGT", *YouTube* http://www.youtube.com/watch?v=wfYL9hjLxg4 Mar. 18, 2010 , 1 page.

* cited by examiner

CONTROLLING WAGERING GAME SYSTEM AUDIO

RELATED APPLICATIONS

This application claims the priority benefit of U.S. Provisional Application Ser. No. 61/187,134 filed Jun. 15, 2009.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

TECHNICAL FIELD

Embodiments of the inventive subject matter relate generally to wagering game systems and networks that, more particularly, control wagering game system audio.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE DRAWING(S)

Embodiments are illustrated in the Figures of the accompanying drawings in which.

Figure 12:
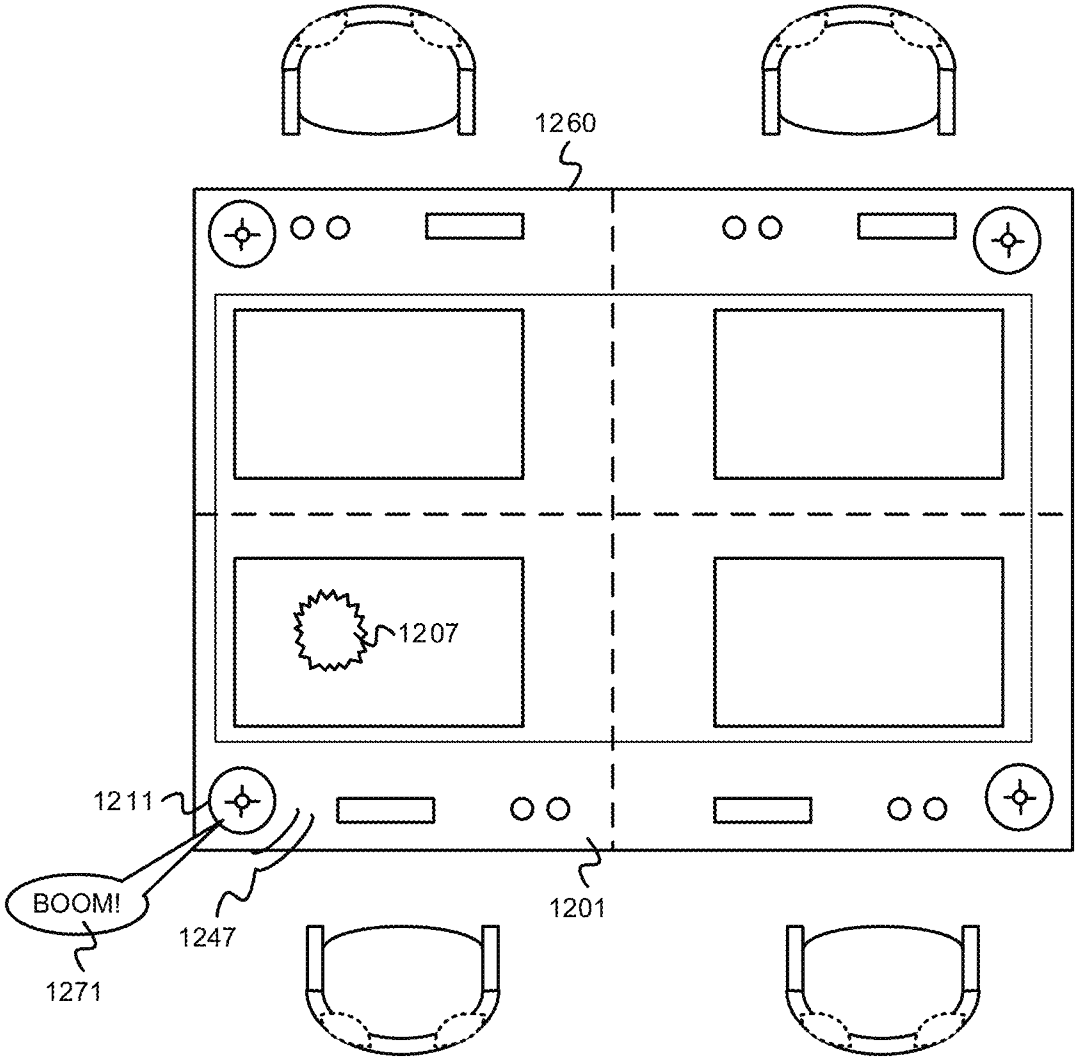

FIGS. 11A, 11B, 11C, and 11D are illustrations of different types of sound scripts configured for use by the wagering game system 1000, according to some embodiments; and FIG. 12 is an illustration of a wagering game table 1260, according to some embodiments.

DESCRIPTION OF ILLUSTRATIVE EMBODIMENTS

This description of the embodiments is divided into six sections. The first section provides an introduction to embodiments. The second section describes example operating environments while the third section describes example operations performed by some embodiments. The fourth section describes additional example embodiments while the fifth section describes additional example operating environments. The sixth section presents some general comments.

INTRODUCTION

This section provides an introduction to some embodiments.

Many computerized wagering game systems have a variety of sound and graphical elements designed to attract and keep a game player's attention, such as sound effects, music, and animation. These game presentation features often include a variety of music, sound effects, and voices presented to complement a visual (e.g., video, computer animated, mechanical, etc.) presentation of the wagering game on a display. Often, multiple gaming applications run on a wagering game machine at the same time. The multiple gaming applications can compete for sound resources, fighting for the foreground. For example, a main, or primary, game application ("primary game") can be running on a wagering game machine. At the same time a secondary game application ("secondary game") can also be presented on the wagering game machine. The secondary game can be an application (e.g., a server-side game) that is independent of the first game. A secondary game server can present the secondary game on the wagering game machine. Both the primary game and the secondary game present sounds that compete for the player's attention. However, because the primary and secondary games were developed separately from each other, and their audio tracks were not mastered or mixed together, they may have competing sounds that clip or distort each other when played at the same time, potentially providing a confusing or unsatisfactory gaming sound experience for the player.

Some embodiments of the present subject matter describe examples of controlling wagering game system audio on a wagering game machine or other computerized system in a networked wagering venue (e.g., a casino, an online casino, a wagering game website, a wagering network, etc.). Embodiments can be presented over any type of communications network (e.g., public or private) that provides access to wagering games, such as a website (e.g., via wide-area-networks, or WANs), a private gaming network (e.g., local-area-networks, or LANs), a file sharing networks, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.). In some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Figure 1:
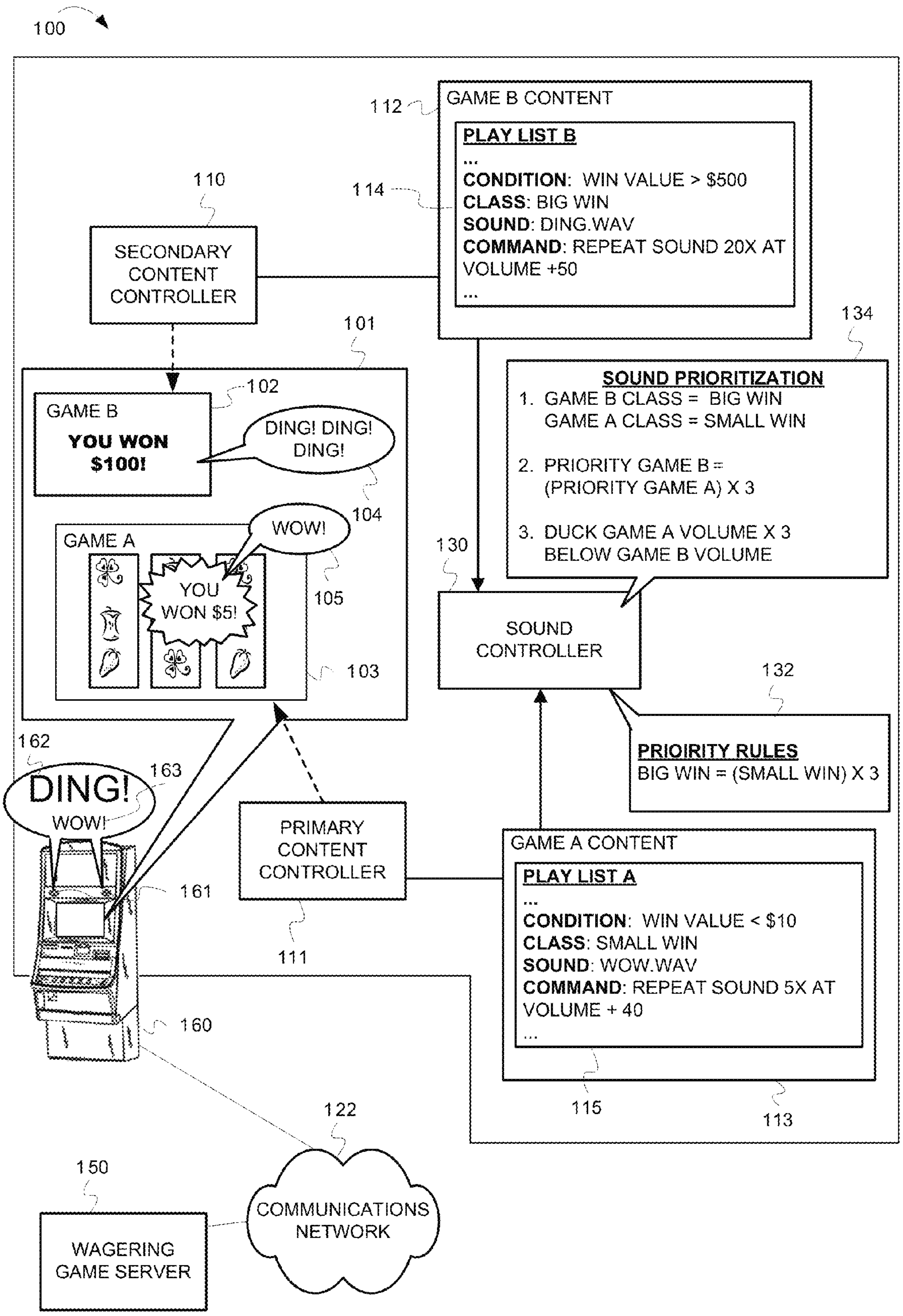
FIG. 1 is an illustration of controlling wagering game audio using class data, according to some embodiments.

FIG. 1 is a conceptual diagram that illustrates an example of controlling wagering game audio using class data, according to some embodiments. In FIG. 1, a wagering game system ("system") 100 includes a wagering game machine 160 connected to a wagering game server 150 via a communications network 122. The wagering game machine 160 can include a display 101 that presents multiple wagering game applications, including a primary application (e.g., primary wagering game application "A" 103) and a secondary application (e.g., secondary wagering game application "B" 102). The primary wagering game application A (Game A) 103 can be controlled by a primary content controller 111 and the secondary wagering game application B (Game B) 102 can be controlled by a secondary content controller 110. In some embodiments the primary content controller 111 and the secondary content controller 110 may be the same controller. In other embodiments, however, they can be separate, and can be on the wagering game machine 160 or outside the wagering game machine 160. In some embodiments, the primary content controller 111 can access content stored locally on the wagering game machine 160, such as Game A content 113. The Game A content 113 may include game assets, including sound content (e.g., playlist A 115). The playlist A 115 can include data related to sounds that are played at certain times, or under certain conditions, for the Game A 103. The playlist A 115 for example includes a sound (wow.wav) that plays when the condition of a "win" occurs when the win is less than $10. The playlist A 115 can also specify sound play commands, such as a command to play and repeat the wow.wav sound file five times. In addition to data that specifies conditions, sound files and commands, the playlist A 115 may also include information that categorizes the condition. For instance, the playlist A 115 includes a "class" that defines a win less than $10 as a "small win class." The secondary content controller 110 can access content stored, such as Game B content 112. The Game B content 112 can be stored locally on the wagering game machine 160. In some embodiments, however, the Game B 102 may be may be a server-side game whose game logic is primarily stored on the wagering game server 150 with minimal presentation control logic on the wagering game machine 160. The Game B content 112 may include game assets, including sound content (e.g., playlist B 114). The playlist B 114 can include data related to sounds that are played at certain times, or under certain conditions, for the Game B 102. The playlist B 114 for example includes a sound (ding.wav) that plays when the condition of a "win" occurs when the win is greater than $500. The playlist B 114 can also specify sound play commands, such as a command to play and repeat the ding.wav sound file twenty times. In addition to data that specifies conditions, sound files and commands, the playlist B 114 may also include information that categorizes the condition. For instance, the playlist B 114 includes a "class" that defines a win greater than $500 as a "big win class." A sound controller 130 can access priority rules 132 and can determine how classes are prioritized. The sound controller 130 can also determine prioritization values, or factors (e.g., determine the big win class is greater than the small win class by a numerical factor of 3, or is three times more important than the small win class). The sound controller 130 can use the priority rules to create sound prioritization control information ("sound prioritization") 134 that the system 100 can use to control the sound volume for sound effects (e.g., a first sound effect 104 for the Game B 102 and a second sound effect 105 for the Game A 103). The system 100 can, for instance, duck, or attenuate, the second sound effect 105 from the Game A 103 by a value commensurate with the prioritization values or factors (e.g., attenuate second sound effect 105 from the Game A 103 by a factor of 3, or other proportional factor associated with the prioritization value). The sound controller 130 can play the sound effects 104 and 105 on speakers 161 for the wagering game machine 160 based on the sound prioritization 134. The playlists (i.e., the playlist A 115 and the playlist B 114) are independently modifiable, meaning that the system 100 can modify the classes, or receive updated modifications of classes or playlists, without having to update other game content for the games. Thus, the system 100 can update classes on an ongoing basis to compensate for changes in conditions or interpretations of conditions over time, as new technology is introduced, as new applications are installed, etc. Further, the system 100 controls sound prioritization versus individual applications. Thus primary game applications and secondary applications do not have to be aware of each other's sound needs or continuously broadcast pre-programmed prioritization data, and thus can be relieved of having to fight for sound priority. Instead, the system 100 prioritizes the sound content volume, or other sound characteristics, (e.g., timing, frequency, directionality, etc.) based on the class data.

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
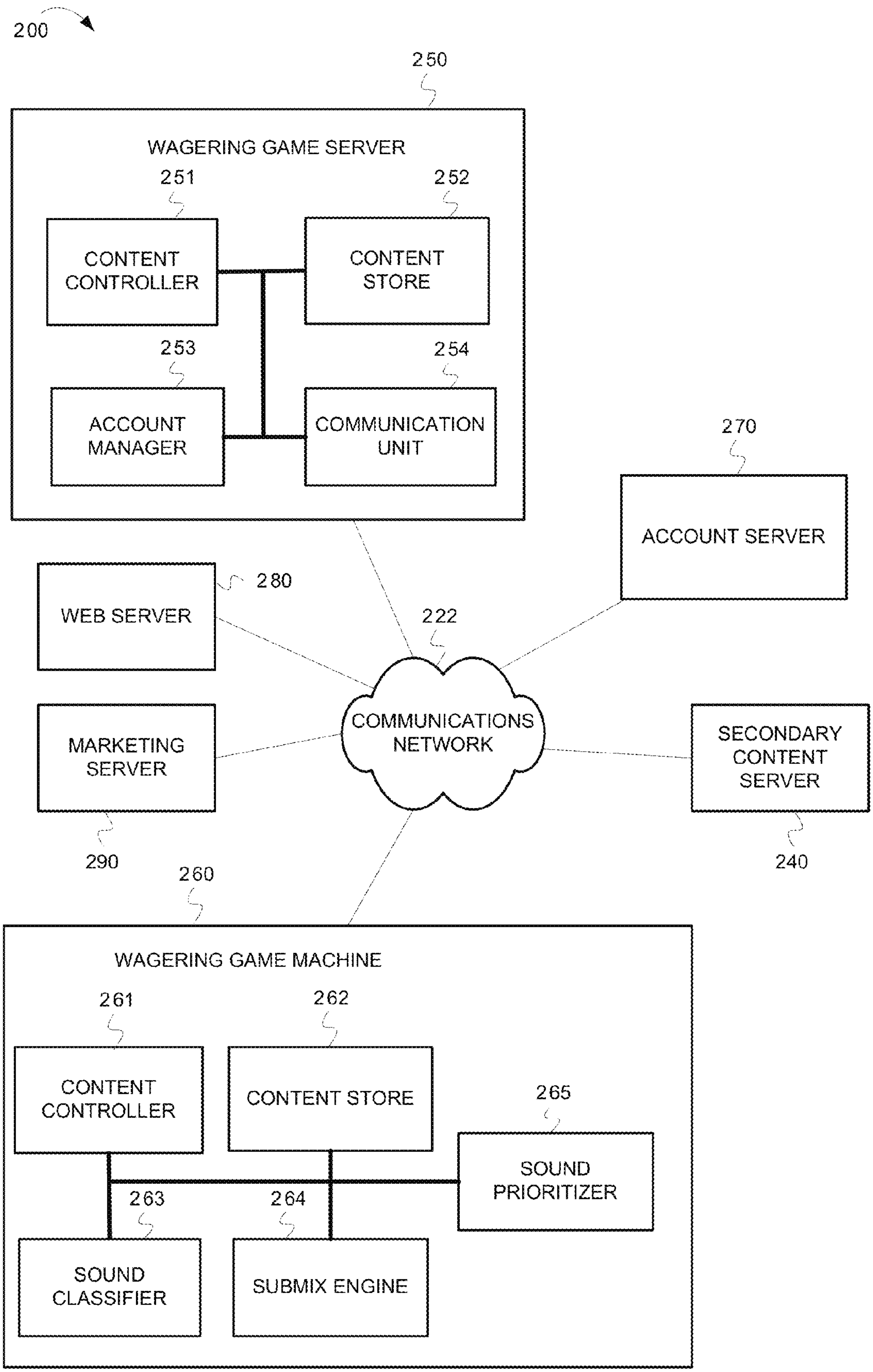
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networks. The account server 270 can store and track player information, such as identifying information (e.g., avatars, screen name, account identification numbers, etc.) or other information like financial account information, social contact information, etc. The account server 270 can contain accounts for social contacts referenced by the player account. The account server 270 can also provide auditing capabilities, according to regulatory rules, and track the performance of players, machines, and servers.

The wagering game system architecture 200 can also include a wagering game server 250 configured to control wagering game content, provide random numbers, and communicate wagering game information, account information, and other information to and from a wagering game machine 260. The wagering game server 250 can include a content controller 251 configured to manage and control content for the presentation of content on the wagering game machine 260. For example, the content controller 251 can generate game results (e.g., win/loss values), including win amounts, for games played on the wagering game machine 260. The content controller 251 can communicate the game results to the wagering game machine 260. The content controller 251 can also generate random numbers and provide them to the wagering game machine 260 so that the wagering game machine 260 can generate game results. The wagering game server 250 can also include a content store 252 configured to contain content to present on the wagering game machine 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the wagering game machine 260 and to communicate with other systems, devices and networks.

The wagering game system architecture 200 can also include the wagering game machine 260 configured to present wagering games and receive and transmit information to control wagering game system audio, including prioritizing audio based on classes, or other categories. The wagering game machine 260 can include a content controller 261 configured to manage and control content and presentation of content on the wagering game machine 260. The wagering game machine 260 can also include a content store 262 configured to contain content to present on the wagering game machine 260. The wagering game machine 260 can also include a sound classifier 263 configured to determine sound characteristics and metadata for sound content, including sound classifications of wagering games and other applications associated with wagering games and gaming venues. The wagering game machine 260 can also include a submix engine 264 configured to compile sound from multiple playlists, or other sources, into a master playlist. The wagering game machine 260 can also include a sound prioritizer 265 configured to prioritize the presentation of sound content using sound characteristics including sound classifications and/or types.

The wagering game system architecture 200 can also include a marketing server 290 configured to utilize player data to determine marketing promotions that may be of interest to a player account. The marketing server 290 can also analyze player data and generate analytics for players, group players into demographics, integrate with third party marketing services and devices, etc. The marketing server 290 can also provide player data to third parties that can use the player data for marketing.

The wagering game system architecture 200 can also include a web server 280 configured to control and present an online website that hosts wagering games. The web server 280 can also be configured to present multiple wagering game applications on the wagering game machine 260 via a wagering game website, or other gaming-type venue accessible via the Internet. The web server 280 can host an online wagering website and social network. The web server 280 can include other devices, servers, mechanisms, etc., that provide functionality (e.g., controls, web pages, applications, etc.) that web users can use to connect to a social network and/or website and utilize social network and website features (e.g., communications mechanisms, applications, etc.).

The wagering game system architecture 200 can also include a secondary content server 240 configured to provide content and control information for secondary games and other secondary content available on a wagering game network (e.g., secondary wagering game content, promotions content, advertising content, player tracking content, web content, etc.). The secondary content server 240 can provide "secondary" content, or content for "secondary" games presented on the wagering game machine 260. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa.

Each component shown in the wagering game system architecture 200 is shown as a separate and distinct element connected via a communications network 222. However, some functions performed by one component could be performed by other components. For example, the wagering game server 250 can also be configured to perform functions of the sound classifier 263, the submix engine 264, the sound prioritizer 265, and other network elements and/or system devices. Furthermore, the components shown may all be contained in one device, but some, or all, may be included in, or performed by multiple devices, as in the configurations shown in FIG. 2 or other configurations not shown. For example, the account manager 253 and the communication unit 254 can be included in the wagering game machine 260 instead of, or in addition to, being a part of the wagering game server 250. Further, in some embodiments, the wagering game machine 260 can determine wagering game outcomes, generate random numbers, etc. instead of, or in addition to, the wagering game server 250.

The wagering game machines described herein (e.g., the wagering game machine 260 can take any suitable form, such as floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable storage media including instructions for performing the operations described herein

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
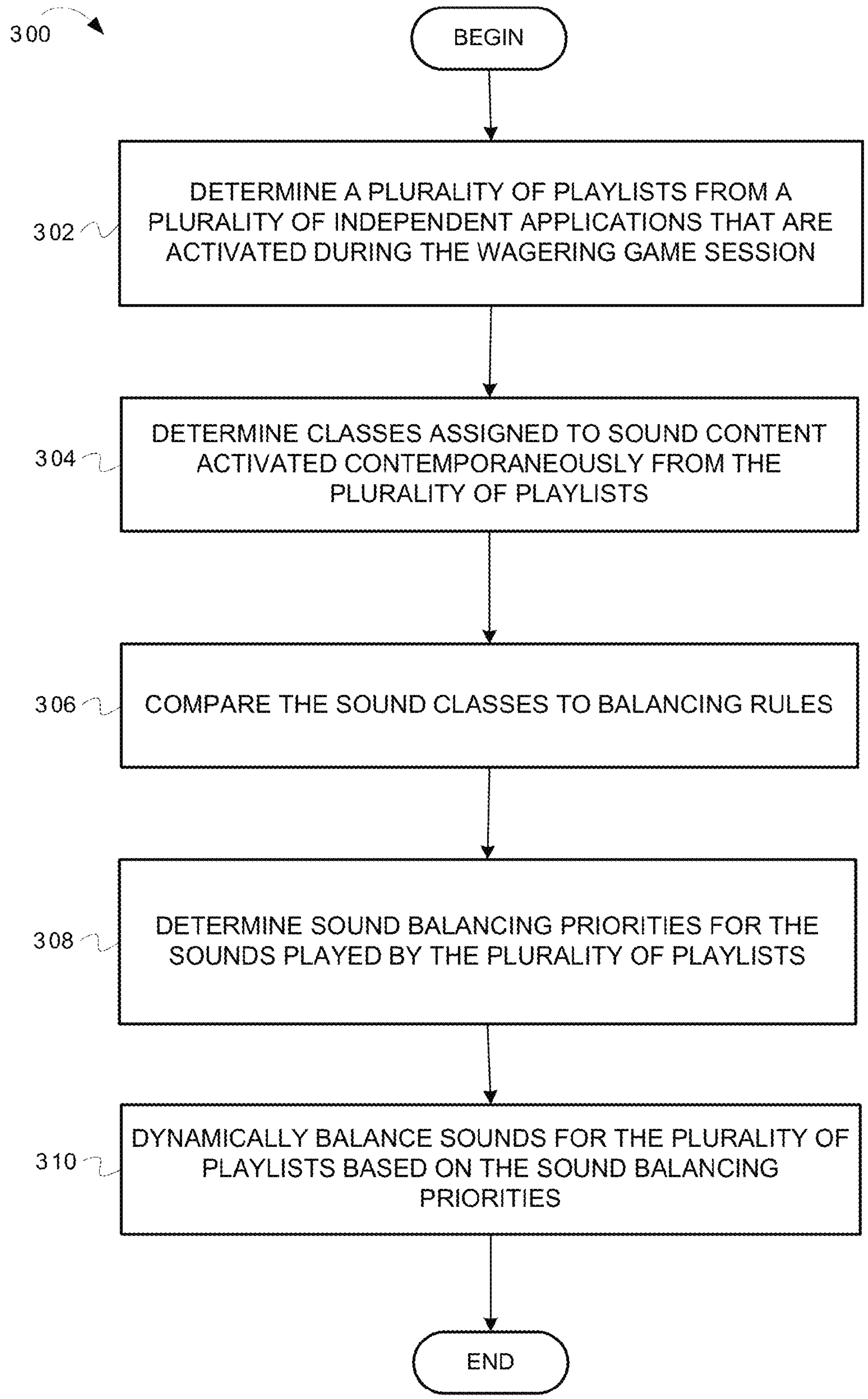
FIG. 3 is a flow diagram 300 illustrating controlling wagering game audio for multiple gaming applications, according to some embodiments.
Figure 4:
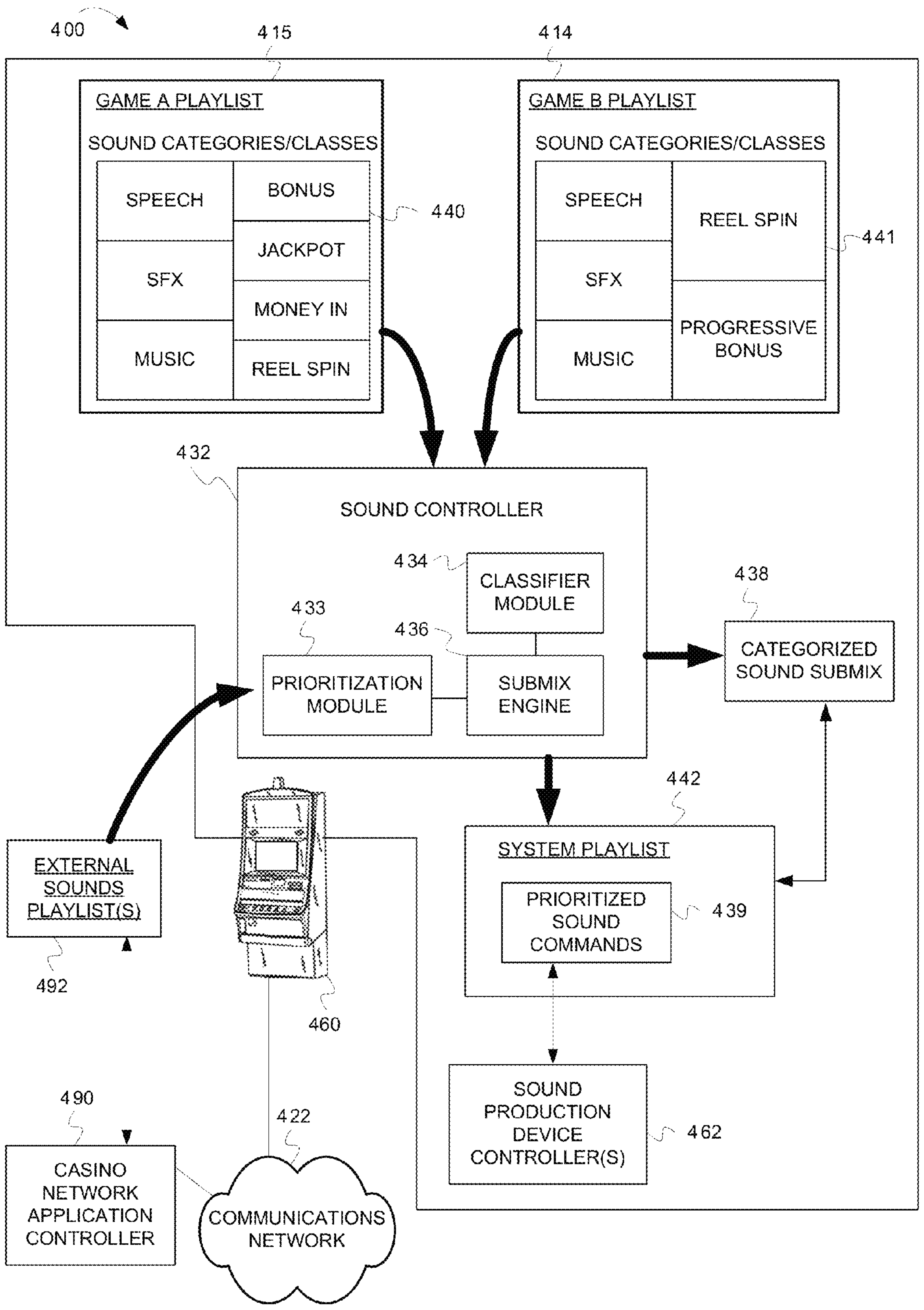
FIG. 4 is an illustration of prioritizing playlist commands, according to some embodiments.
Figure 5:
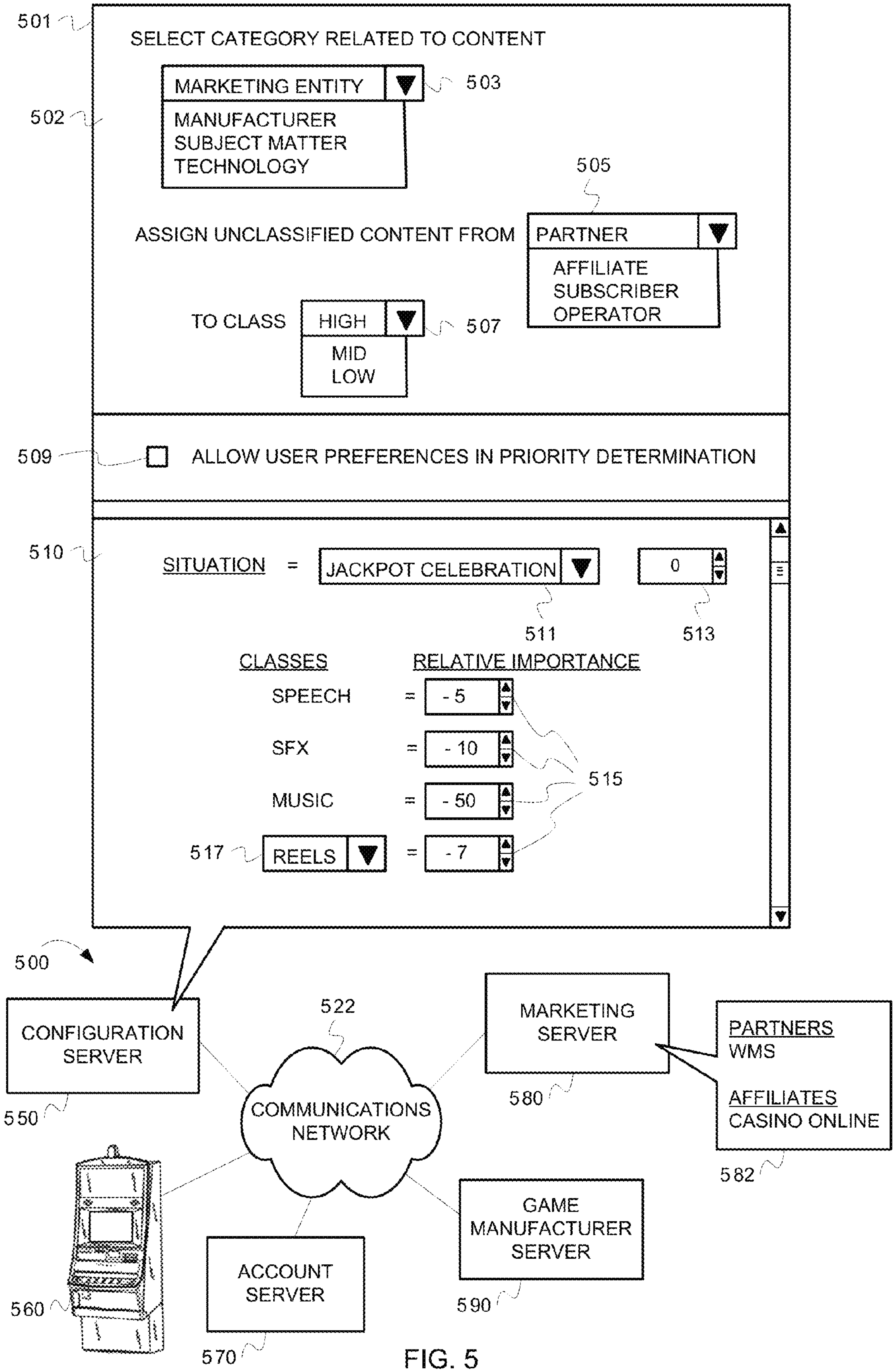
FIG. 5 is an illustration of configuring sound priorities for classes, according to some embodiments.

FIG. 3 is a flow diagram ("flow") 300 illustrating controlling wagering game audio for multiple gaming applications, according to some embodiments. FIGS. 1, 4, and 5 are conceptual diagrams that help illustrate the flow of FIG. 3, according to some embodiments. This description will present FIG. 3 in concert with FIGS. 1, 4 and 5. In FIG. 3, the flow 300 begins at processing block 302, where a wagering game system ("system") determines a plurality of audio playlists ("playlists") from a plurality of independent applications that are activated during the wagering game session. Each application can have one or more playlists associated with the game sound content. The playlists execute a certain amount of commands (e.g., via playlist scripts that contain multiple commands) that control a sound mix for all sounds within the game (i.e., controls sounds for the applications soundtrack). The playlist has commands that control sound volumes, timing, frequencies, etc. based on sounds that may play at the same time and/or oppose each other on the application's soundtrack. The playlist maintains an internal balance of sound commands for the application. Playlists control self-contained sound mixes. Self-contained sound mixes includes sound assets for a single application or game (e.g., music, sound effects, speech). Playlists have pre-set scenarios of game conflicts that will control which sounds assets are more importance based on the scenario. The playlists control the sound assets to consume certain amounts of available audio space on a sound track (e.g., controlled when the sound assets are played louder or softer, such as a reel spin effect that gets highest priority when a game reel is activated, or a jackpot celebratory sound effect that gets highest priority when a jackpot wins). The playlist increases the volume (or modifies other sound characteristics) for the most prevalent sound asset and ducks (e.g., reduces, minimizes, etc.) other audio assets in volume (or other sound characteristics) that play at the same time. The playlist commands balance (e.g., duck, attenuate, magnify, etc.) the sounds when prevalence demands. The playlist commands are pre-set and activate during a game as it is played, generating a well balanced, well mixed game sound that eliminates player confusion, reduces audio clipping, and generates a quality playing experience. However, playlists only control sounds for a single application for which they were developed. Often, multiple applications are running at the same time during a wagering game session. The sounds from the multiple applications can create unbalanced, poorly mixed sounds including distortions, clipping, conflicts, etc. The system, however, can determine a plurality of playlists from a plurality of independent applications that are activated at a specific time during the wagering game session and use information from the playlists to control and balance all of the sounds for the gaming session. In FIG. 4, a wagering game system ("system") 400 demonstrates an example of a sound controller 432 that receives pre-configured playlists from multiple gaming applications and balances sounds between the gaming applications. The system 400 can include a wagering game machine 460 connected to a casino network application controller 490 via a communications network 422. The wagering game machine 460 includes the sound controller 432 that receives and/or accesses multiple playlists (e.g., Game A playlist 415 and Game B playlist 414) for multiple applications. The system 400 can determine activity (e.g., events, control selections, game results, etc.) that occurs within the multiple applications as well as activity that occurs from external events, such as events from network entertainment applications (e.g., light and sound shows), progressive game applications, network game applications, server-side gaming applications, advertising applications, marketing applications, etc. that occurs external to the applications on the wagering game machine 460. The system 400 determines specific playlists that are utilized or associated with the activity. Sound for external events can be controlled by the casino network application controller 490, which accesses an external sounds playlist 492 that includes sounds and commands for the external events. In some embodiments, the system 400 can receive, or obtain, sound content (e.g., assets, commands, play list scripts, sound effects, etc.) from, or accessible to, the playlists (e.g., from the Game A playlist 415, the Game B playlist 414, and the external sounds playlist 492).

The flow 300 continues at processing block 304, where the system determines classes assigned to sound content activated contemporaneously from the plurality of playlists. The activated sound content can be scheduled to play, or playing, simultaneously, at a given time, during the gaming session. Sounds that are activated contemporaneously, and that play concurrently, have some degree of overlap in their audible presentation such that there exists a possibility that the sounds may compete for the same audible space or potentially conflict in their presentations. The sound classes can be types, categories, etc. of the sounds. Examples of classes may include general classifications of sounds, such as speech, special effects, music, etc., as well as wagering game specific classifications, such as jackpot sounds, reel spin sounds, game character sounds, money-in sounds, bonus game sounds, congratulatory sounds, etc. In some embodiments, the system can determine the class data from playlist commands and other information stored with the application and its assets. Each sound content item can have one or more classes assigned to it. The classes can relate to a group of sounds, such as a class that describes an entire type of application (e.g., main game, bonus game, advertisement, etc.), individual sounds produced by an application (e.g., music, speech, special effects, etc.), or other types of information. The classes can have pre-assigned values, or parameters, that were associated with gaming assets during post-production and mixing of the gaming content. In some embodiments, the system can also assign classes to applications that lack class data. In FIG. 4, the sound controller 432 receives the sound content indicated by, or provided by, the playlists 414, 415, and 492. The sound controller 432 can use a classifier module 434 to read classifications, or categories associated with sound content. The playlists 414, 415, and 492 can have classifications, or categories (e.g., sound categories 440 and 441), of sound data which describe the types of sound content provided within the playlists 414, 415, 492. The classifier module 434 and a submix engine 436 can organize (e.g., combine, store, etc.) sound content items, and their class data, received from the playlists 414, 415, and 492 into a categorized sound submix 438. In some embodiments, if there are no classes assigned to sound content (e.g., an application does not have an associated playlist, a playlist is available but no classes are assigned to sounds, etc.), the system 400 can automatically assign a class to the unassigned sound content. The system 400 can assign classes to an application as a whole or to specific types of sounds coming from an application. For example, the wagering game machine 460 may launch an application for a game that was not developed with a classified playlist. If the system 400 cannot ascertain specific information about the application, or if the information is not helpful for classifying sound, the system 400 may assign an "un-assigned" class. If the system 400 can determine helpful information about the sound, or other aspects of the application that may provided a useful classification, the system 400 can assign specific classes to the applications and/or sounds from the application. For instance, the classifier module 434 can determine a type of technology involved in the application, a manufacturer of the application, a marketing status for the application, an application specification, a subject matter of the application, a game genre for the application, a player preference for the application, player history associated with the application, or other characteristics and identifying information about the application or its individual sound content items. The sound controller 432 can then assign specific classes (e.g., a technology class, a manufacturer class, a subject matter class, a denomination class, a game genre class, etc.). For example, some independent games can be flash games provided by multiple game manufacturers. The sound controller 432 can therefore assign the class of "flash" to sounds for those flash games. In other examples, the system 400 can assign classes based on subject matter (e.g., a bonus, a secondary wagering game, a utility panel, an advertisement, a notification, a social communication, etc.). In some embodiments, the system 400 can assign a class to an application as a whole as well as assign different sound classes to individual sounds within an application. In some embodiments, the system 400 can assign additional details to an unknown application (e.g., additional classes, sound commands, etc.) by analyzing sound factors from the application. In some instance, the application may provide its own sound factors. If no sound factors are provided with the application, however, the system 400 can ascertain, mechanically, the sound qualities that come from the application (e.g., can monitor the sound pressure level of the generated signal source from the application and dynamically control the sounds), and, based on the mechanically ascertained sound quality data, generate specific classes that seem appropriate. In some embodiments, the system 400 can assign classes to applications and sounds from the application even if an application already has classes assigned within its playlist. Returning to FIG. 3, in some embodiments, the system can provide configuration tools to set classes for conditions. Manufacturers, operators, or others, can use the tool to pre-configure a playlist with class information including modifying code in a playlist from one class to another class, configuring unclassified types, assigning classes to unclassified content, generating priority rules, etc. FIG. 5 illustrates an example of a wagering game system ("system") 500 including a configuration server 550. The configuration server 550 can be connected to a communications network 522. Also connected to the communications network 522 is one or more marketing servers (e.g., marketing server 580), one or more game manufacturer servers (e.g., game manufacturer server 590), an account server 570, and a wagering game machine 560. The configuration server 550 can include a configuration graphical user interface ("configuration interface") 501. The configuration interface 501 can include separate sections, including an assignation console 502, a settings console 509, and a prioritization console 510. The assignation console 502 can be used to assign classes to categories and/or types of data related to applications run on the wagering game machine 560. For example, the assignation console 502 can include a category control 503 that lists different types or categories of data that relates to gaming applications. For instance, one category is a marketing entity which specifies that an application may be related to one or more marketing entities that advertise content, or that provide content, to present on the wagering game machine 560. The assignation console 502 may also include a sub-category control 505 that may select specific types of data that are subcategories, or further refinements, of the category selected in the category control 503. The sub-category control 505 may change dynamically based on the selection in the category control 503. For example, when the "marketing entity" selection was selected in the category control 503, the sub-category control 505 updated dynamically to list different types of marketing entities (e.g., affiliates, subscribers, operators, etc.), marketing entity levels (e.g., gold, silver, standard, etc.), actual entities, etc. The marketing server 580 can include a marketing entity list 582 that indicates marketing entities and their classifications. The assignment console 502 can also include a class assignment control 507 that lists different classes that can be assigned based on the selections in the category control 503 and the sub-category control 505. For instance, in the class assignment control 507 different classes are listed, which indicate "unassigned" class types that indicate importance levels. The settings console 509 may include settings related to making and/or using classifications, such as indicating whether the system 500 can refer to users and player accounts for assistance with assigning classes, in determining priorities, etc. For example, a player account may include one or more preference settings that indicate a preference (1) to hear music louder than celebratory sounds, (2) to favor advertising sound content to game sound content, (3) to enhance sounds for specific game content types or from specific game manufacturers, etc. The prioritization console 510 can be used to indicate relativity between classes for a specific game, activity, situation, etc. For instance, the prioritization console 510 includes a situation control 511 that lists different situations that may occur during a wagering game, such as a "jackpot celebration." The prioritization console 510 can include a basis control 513 that sets a basis level to which classes will be relatively ranked. The prioritization console 510 also includes ranking controls 515 that can set values indicating the relative importance to the basis value indicated in the basis control 513. For example, the ranking controls 515 indicate that during a jackpot celebration, the jackpot celebration sounds are the most important of the sound classes (a basis of "0"). The next most important class of sound is "speech" (a relative importance of −5 from the basis of 0), followed by reel sounds (−7) indicated in the dropdown 517, special effects (−10) and music (−50). The system 500 can use the values in the ranking controls 515 to generate priority rules that the system 500 can later use to determine priorities for sound content. The system 500 can use the values in the ranking controls 515 to generate prioritization values, or factors, such the factors indicated in the priority rules 132 in FIG. 1. For instance, the values in the ranking controls 515 can specify a degree or level that sound should be attenuated compared to the basis sounds. For example, the jackpot celebration sounds would not be attenuated because the basis value is set to 0. Speech sounds would be ducked, or attenuated, by five degrees (e.g., by five decibels, by five volume settings on a speaker, etc.), because of the "−5" rank value. The system 400 can use the rank values to create comparative statements for classes (e.g., jackpot celebration class=(speech class)×5). The system 500 can then store the comparative statements store in priority rules.

The flow 300 continues at processing block 306, where the system compares the sound classes to prioritization rules. The prioritization rules have preset priorities that provide control information based on any given scenario, including current application activity occurring at the given time. The system compares the sound class values to values indicated in the rules. The values in the rules are associated with the current application activity and the rules also include possible responses to the activity. The system determines the current application activity that occurs for the applications by monitoring gaming events, or other types of events, that occur within the applications. The system can determine specific playlists, or specific portions of a playlist, that are associated with the current application activity. Any given application may have more than one playlist, or separate parts of the playlist, that pertain to the current application activity. The system can determine, from the plurality of playlists, sound content that is related to the current application activity. The system can determine, from the plurality of playlists, the sound classes that are associated with the sound content. The system can then refer to the priority rules and determine, from the priority rules, activity indicators that describe the application activity. For example, in FIG. 1, the priority rules 132 includes a comparative statement (e.g., big win=(small win)×3) which is an indicator of the current situation occurring on the wagering game machine 160 at the current time (i.e., a big win event is occurring at the same time that a small win event occurs, each with the competing sound effects 104 and 105 respectively). The system 100 determines, from the priority rules, the priority values, which are associated with the activity indicators (e.g., the factor of 3 associated with the comparative statement). The system 100 can then compare the priority values to determine which has a higher value for the current application activity at the given time. For instance, the sound controller 130 uses the priority rules 132 to determine the relative values, or comparative priority values, of different classes that relate to the situation occurring contemporaneously for the applications (e.g., comparing the "big win" class to the "small win" class using the comparative factor of three (3) indicated in the priority rules 132). In another example, in FIG. 4, the sound controller 432 can use a prioritization module 433 to compare activities and look up priority values or assign priority values based on the nature of the activities.

The flow 300 continues at processing block 308, where the system determines sound balancing priorities ("sound priorities") for the sounds played by the plurality of playlists. The system can generate hierarchies, or levels, of priorities based on hierarchies or levels of classes (e.g., jackpot might be the highest level). In some embodiments, the system can take into consideration an applications own internal priorities and determine sound priorities using those internal priorities or modes. In other embodiments, however, the system can determine the sound priorities irrespective of an applications modes, internal priorities, etc. The system can have its own intelligence to determine the sound balancing priorities. For instance, in FIG. 4, if an activity, event, or scenario occurs that was not listed in priority rules, the prioritization module 433 may extrapolate a value for a current situation based on values listed for similar scenarios and events indicated in the priority rules. Still referring to FIG. 4, the sound controller 432 generates prioritized sound commands 439. The sound controller 432 can use the prioritized sound commands 439 to controls sounds for all applications that run on the wagering game machine 460 and for other network applications that produce sound on the wagering game machine 460. The sound controller 432 can store the prioritized sound commands 439 in a system playlist 442 on the wagering game machine 460. The wagering game machine 460 can share the system playlist 442 with other networked wagering game machines or network devices (e.g., sound control servers, marketing servers, network game servers, etc.) to refer to and/or to use. For example, a nearby wagering game machine may access information from the system playlist 442 (e.g., access the system playlist 442, or receive a copy or instance of the system playlist 442) and recognize that the wagering game machine 460 has experienced an important event, such as a jackpot win. The nearby wagering game machine may use that information to control its own sounds, such as to draw audible attention to the wagering game machine 460, to create congratulatory effects, to prioritize sounds on the nearby wagering game machine, etc.

The flow 300 continues at processing block 310, where the system dynamically balances the system sounds based on the sound balancing priorities. For instance, in FIG. 4, the system 400 uses the prioritized sound commands 439 to control sounds using sound production device controller(s) 462, such as for speakers, sound deflectors, musical instruments, etc. associated with the wagering game machine 460. The wagering game machine 460 can control sound production devices using the system playlist 442. In FIG. 1, the system 100 controls the volume levels of sound effects that play contemporaneously, or concurrently, on the wagering game machine 160. As described previously, the system 100 attenuates the second sound effect 105 at the speakers 161 to generate a modified sound 163 for the second sound effect 105. However, in other embodiments, the modified sound 163 can include modifications to sound qualities and characteristics other than, or in addition to, sound attention. For example, the system 100 could adjust frequencies or repetitions of sounds, adjust timing of sound production, or perform other effects that give an audible priority to the first sound effect 104. For instance, the system 100 can attenuate volume of the second sound effect 105, delay sound production for the second sound effect 105, reduce repetitions of the second sound effect 105, increase volume of the first sound effect 104, produce sound production for the first sound effect 104 first in time, and increase repetitions of the first sound effect 104. The first sound effect 104 thus comes from the speakers 161 as a prioritized sound 162, which is louder, first in time, longer, more repetitious, and/or otherwise prioritized to have greater prevalence or importance than the modified sound 163. In some embodiments, the system 100 can produce the modified sound 163 proportional to priority values, comparative values, etc. For instance, in one embodiment, the system 100 can attenuate the second sound effect 105 by a numerical sound factor (e.g., a decibel level or range) equivalent to, or otherwise proportional to, the numerical priority factor indicated in the priority rules 132 (e.g., reduce sound volume of the second sound effect 105 by the factor of 3, as indicated in the priority rules 132, so that the modified sound 163 is three times quieter than the prioritized sound 162). In some embodiments, to prevent sound distortions, the system 100 can simulate the sound effects 104 and 105 before playing them on the speakers 161 to determine if clipping or other sound distortions would occur to the sounds when played at the same time. The system 100 can utilize the simulation data to adjust sounds for one, or both, of the first sound effect 104 and the second sound effect 105, yet still produce the prioritized sound 162. Thus, both of the sound effects 104 and 105 may be modified, but the sound effect with the higher priority would still have a prioritized sound.

Additional Example Embodiments

According to some embodiments, a wagering game system ("system") can provide various example devices, operations, etc., to control wagering game system audio. The following non-exhaustive list enumerates some possible embodiments.

- In some embodiments, the system can balance sounds across near-by machines, or across machines on a network. The system can assign classes, for example, to a network wide sound content (e.g., an emergency announcement, a DMX system-wide light show, etc.) and can balance sounds for all applications currently playing on the wagering game machines that receive the announcement (e.g., the system ducks sound levels for all applications, giving higher priority to the network sound content).
- In some embodiments, the system can adjust sounds based on various channels of sounds from the same application.
- In some embodiments, the system can utilize sound priorities to ban specific games or applications based on classes.
- In some embodiments, the system can adjust sounds across multiple sound production devices on the same wagering game machine.
- In some embodiments, the system can adjust sound based on background noise. For instance, the system can detect nearby noises from microphones attached to a wagering game machine. The system can then dynamically duck sounds based on a determined sound pressure against the microphone. The system can use responsive envelopes to perform the dynamic ducking
- In some embodiments, the system can be cognizant of other applications sound needs without the applications needing to constantly broadcast their current mode (e.g., bonus mode, jackpot mode, etc.) to each other. This is can relieve burdens and resources on game applications and can reduce needs to provide additional programming or complex interfaces between games, can reduce or eliminate the need for applications to be aware of each other, and can reduce or eliminate requirements for applications to interact.
- In some embodiments, the system can pre-configure wagering game machines with tables that indicate classes and priority rules. For example, in FIG. 5, the system 500 can store priority to rules on the wagering game machine 560, and all other wagering game machines, across a casino network.

Additional Example Operating Environments

This section describes example operating environments, systems and networks, and presents structural aspects of some embodiments.

Wagering Game Computer System

Figure 6:
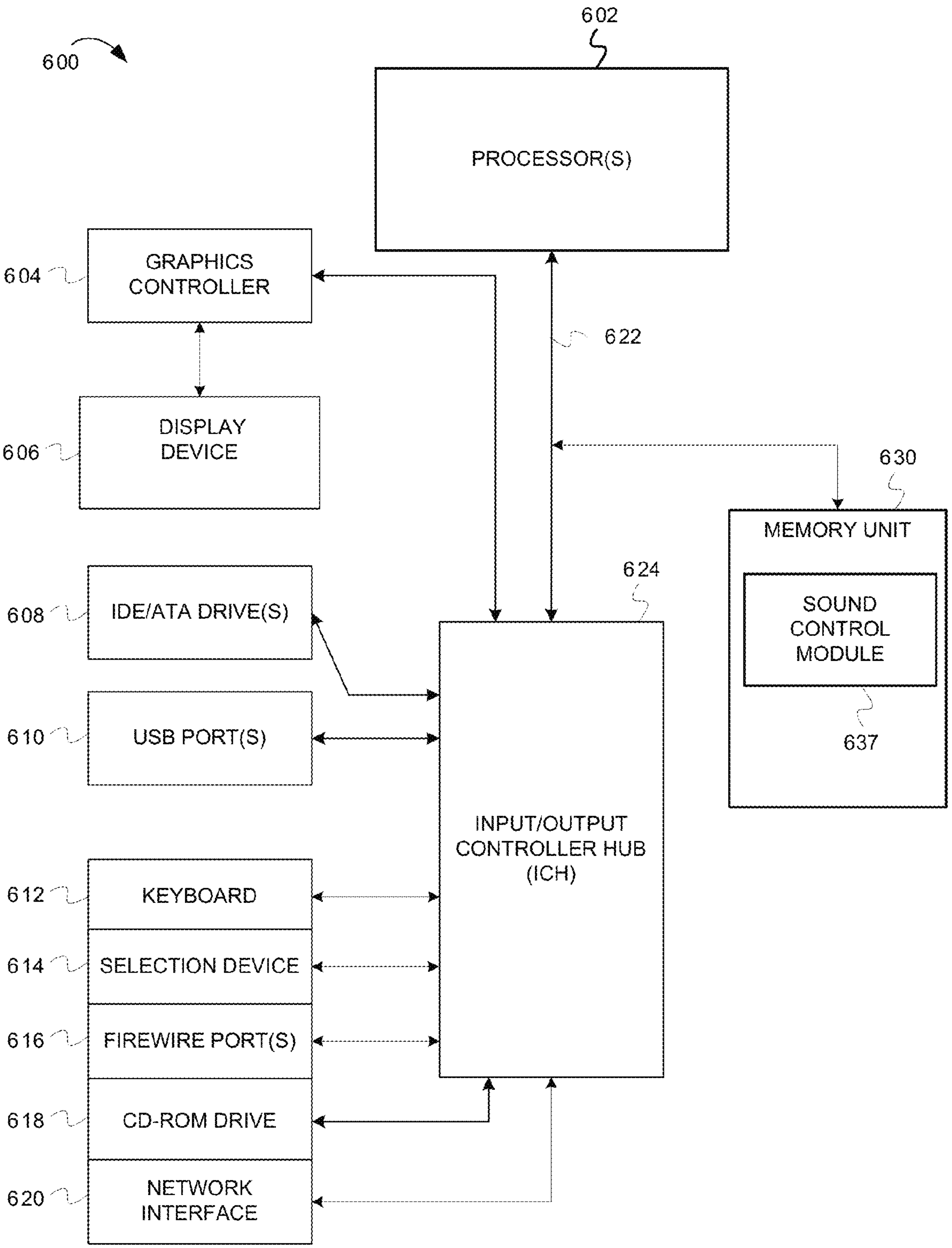
FIG. 6 is an illustration of a wagering game computer system 600, according to some embodiments.

FIG. 6 is a conceptual diagram that illustrates an example of a wagering game computer system 600, according to some embodiments. In FIG. 6, the computer system 600 may include a processor unit 602, a memory unit 630, a processor bus 622, and an Input/Output controller hub (ICH) 624. The processor unit 602, memory unit 630, and ICH 624 may be coupled to the processor bus 622. The processor unit 602 may comprise any suitable processor architecture. The computer system 600 may comprise one, two, three, or more processors, any of which may execute a set of instructions in accordance with some embodiments.

The memory unit 630 may also include an I/O scheduling policy unit 6 and I/O schedulers 6. The memory unit 630 can store data and/or instructions, and may comprise any suitable memory, such as a dynamic random access memory (DRAM), for example. The computer system 600 may also include one or more suitable integrated drive electronics (IDE) drive(s) 608 and/or other suitable storage devices. A graphics controller 604 controls the display of information on a display device 606, according to some embodiments.

The input/output controller hub (ICH) 624 provides an interface to I/O devices or peripheral components for the computer system 600. The ICH 624 may comprise any suitable interface controller to provide for any suitable communication link to the processor unit 602, memory unit 630 and/or to any suitable device or component in communication with the ICH 624. The ICH 624 can provide suitable arbitration and buffering for each interface.

For one embodiment, the ICH 624 provides an interface to the one or more IDE drives 608, such as a hard disk drive (HDD) or compact disc read only memory (CD ROM) drive, or to suitable universal serial bus (USB) devices through one or more USB ports 610. For one embodiment, the ICH 624 also provides an interface to a keyboard 612, selection device 614 (e.g., a mouse, trackball, touchpad, etc.), CD-ROM drive 618, and one or more suitable devices through one or more firewire ports 616. For one embodiment, the ICH 624 also provides a network interface 620 though which the computer system 600 can communicate with other computers and/or devices.

The computer system 600 may also include a machine-readable medium that stores a set of instructions (e.g., software) embodying any one, or all, of the methodologies for control wagering game system audio. Furthermore, software can reside, completely or at least partially, within the memory unit 630 and/or within the processor unit 602. The computer system 600 can also include a sound control module 637. The sound control module 637 can process communications, commands, or other information, to control wagering game system audio. Any component of the computer system 600 can be implemented as hardware, firmware, and/or machine-readable media including instructions for performing the operations described herein.

Wagering Game Machine Architecture

Figure 7:
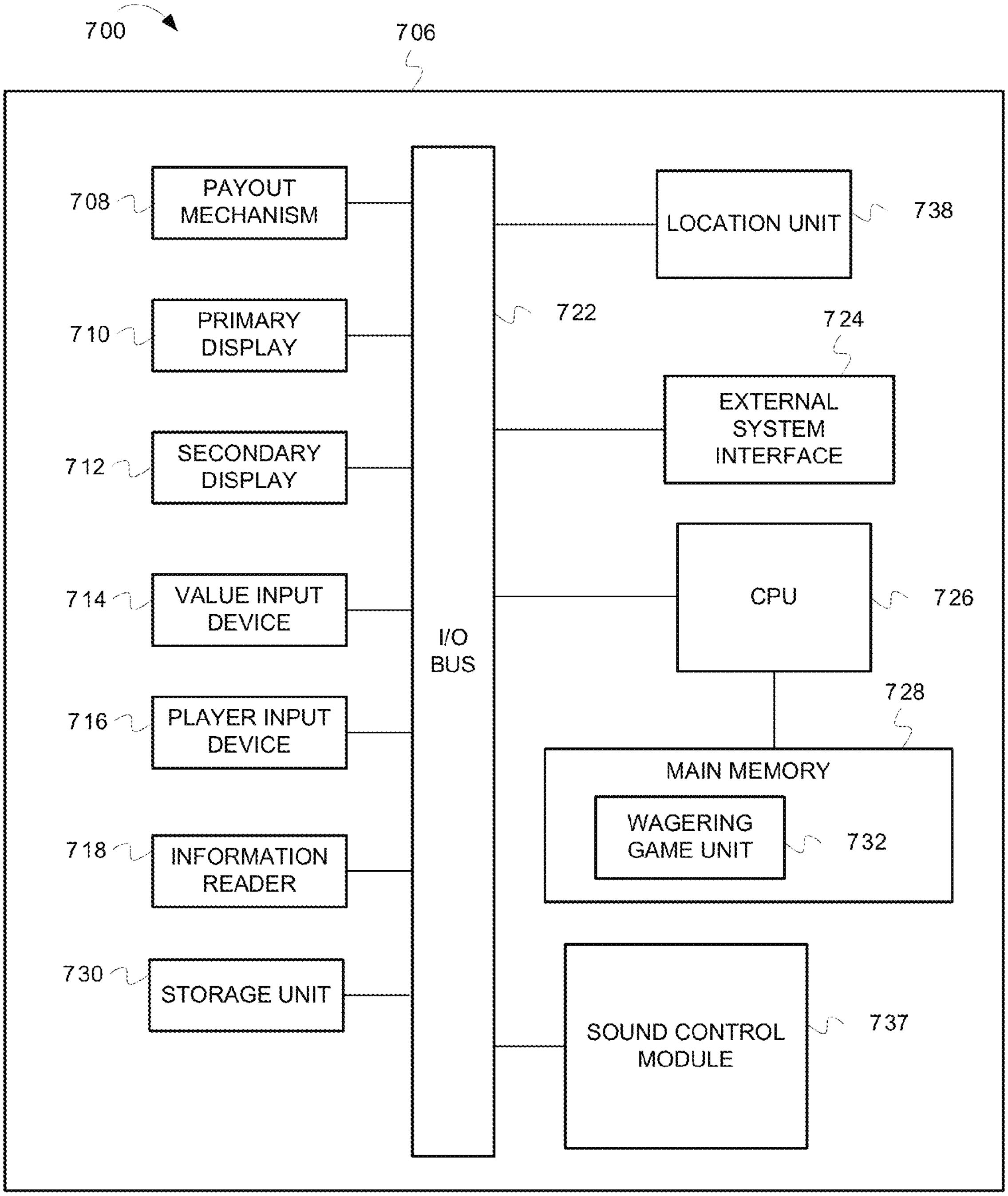
FIG. 7 is an illustration of a wagering game machine architecture 700, according to some embodiments.

FIG. 7 is a conceptual diagram that illustrates an example of a wagering game machine architecture 700, according to some embodiments. In FIG. 7, the wagering game machine architecture 700 includes a wagering game machine 706, which includes a central processing unit (CPU) 726 connected to main memory 728. The CPU 726 can include any suitable processor, such as an Intel® Pentium processor, Intel® Core 2 Duo processor, AMD Opteron™ processor, or UltraSPARC processor. The main memory 728 includes a wagering game unit 732. In some embodiments, the wagering game unit 732 can present wagering games, such as video poker, video black jack, video slots, video lottery, reel slots, etc., in whole or part.

The CPU 726 is also connected to an input/output ("I/O") bus 722, which can include any suitable bus technologies, such as an AGTL+ frontside bus and a PCI backside bus. The I/O bus 722 is connected to a payout mechanism 708, primary display 710, secondary display 712, value input device 714, player input device 716, information reader 718, and storage unit 730. The player input device 716 can include the value input device 714 to the extent the player input device 716 is used to place wagers. The I/O bus 722 is also connected to an external system interface 724, which is connected to external systems (e.g., wagering game networks). The external system interface 724 can include logic for exchanging information over wired and wireless networks (e.g., 802.11g transceiver, Bluetooth transceiver, Ethernet transceiver, etc.)

The I/O bus 722 is also connected to a location unit 738. The location unit 738 can create player information that indicates the wagering game machine's location/movements in a casino. In some embodiments, the location unit 738 includes a global positioning system (GPS) receiver that can determine the wagering game machine's location using GPS satellites. In other embodiments, the location unit 738 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 7, in some embodiments, the location unit 738 is not connected to the I/O bus 722.

In some embodiments, the wagering game machine 706 can include additional peripheral devices and/or more than one of each component shown in FIG. 7. For example, in some embodiments, the wagering game machine 706 can include multiple external system interfaces 724 and/or multiple CPUs 726. In some embodiments, any of the components can be integrated or subdivided.

In some embodiments, the wagering game machine 706 includes a sound control module 737. The sound control module 737 can process communications, commands, or other information, where the processing can control wagering game system audio.

Furthermore, any component of the wagering game machine 706 can include hardware, firmware, and/or machine-readable media including instructions for performing the operations described herein.

Mobile Wagering Game Machine

Figure 8:
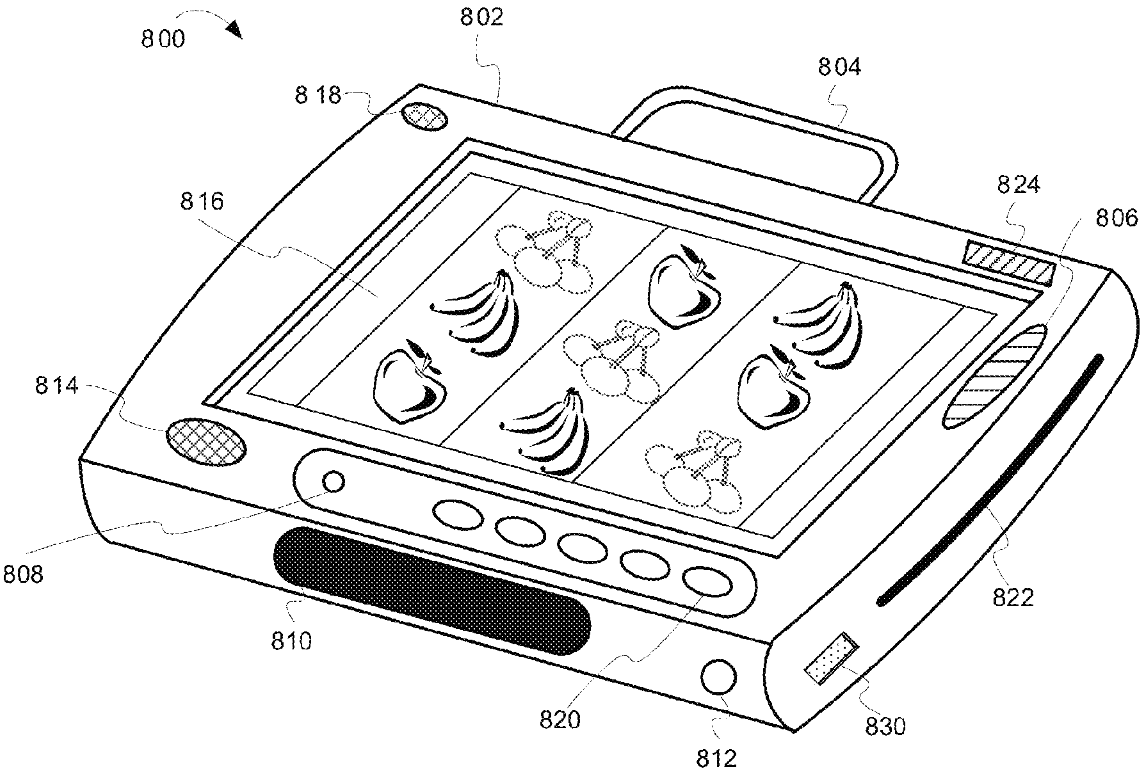
FIG. 8 is an illustration of a mobile wagering game machine 800, according to some embodiments.

FIG. 8 is a conceptual diagram that illustrates an example of a mobile wagering game machine 800, according to some embodiments. In FIG. 8, the mobile wagering game machine 800 includes a housing 802 for containing internal hardware and/or software such as that described above vis-à-vis FIG. 7. In some embodiments, the housing has a form factor similar to a tablet PC, while other embodiments have different form factors. For example, the mobile wagering game machine 800 can exhibit smaller form factors, similar to those associated with personal digital assistants. In some embodiments, a handle 804 is attached to the housing 802. Additionally, the housing can store a foldout stand 810, which can hold the mobile wagering game machine 800 upright or semi-upright on a table or other flat surface.

The mobile wagering game machine 800 includes several input/output devices. In particular, the mobile wagering game machine 800 includes buttons 820, audio jack 808, speaker 814, display 816, biometric device 806, wireless transmission devices (e.g., wireless communication units 812 and 824), microphone 818, and card reader 822. Additionally, the mobile wagering game machine can include tilt, orientation, ambient light, or other environmental sensors.

In some embodiments, the mobile wagering game machine 800 uses the biometric device 806 for authenticating players, whereas it uses the display 816 and the speaker 814 for presenting wagering game results and other information (e.g., credits, progressive jackpots, etc.). The mobile wagering game machine 800 can also present audio through the audio jack 808 or through a wireless link such as Bluetooth.

In some embodiments, the wireless communication unit 812 can include infrared wireless communications technology for receiving wagering game content while docked in a wager gaming station. The wireless communication unit 824 can include an 802.11G transceiver for connecting to and exchanging information with wireless access points. The wireless communication unit 824 can include a Bluetooth transceiver for exchanging information with other Bluetooth enabled devices.

In some embodiments, the mobile wagering game machine 800 is constructed from damage resistant materials, such as polymer plastics. Portions of the mobile wagering game machine 800 can be constructed from non-porous plastics which exhibit antimicrobial qualities. Also, the mobile wagering game machine 800 can be liquid resistant for easy cleaning and sanitization.

In some embodiments, the mobile wagering game machine 800 can also include an input/output ("I/O") port 830 for connecting directly to another device, such as to a peripheral device, a secondary mobile machine, etc. Furthermore, any component of the mobile wagering game machine 800 can include hardware, firmware, and/or machine-readable media including instructions for performing the operations described herein.

Wagering Game Machine

Figure 9:
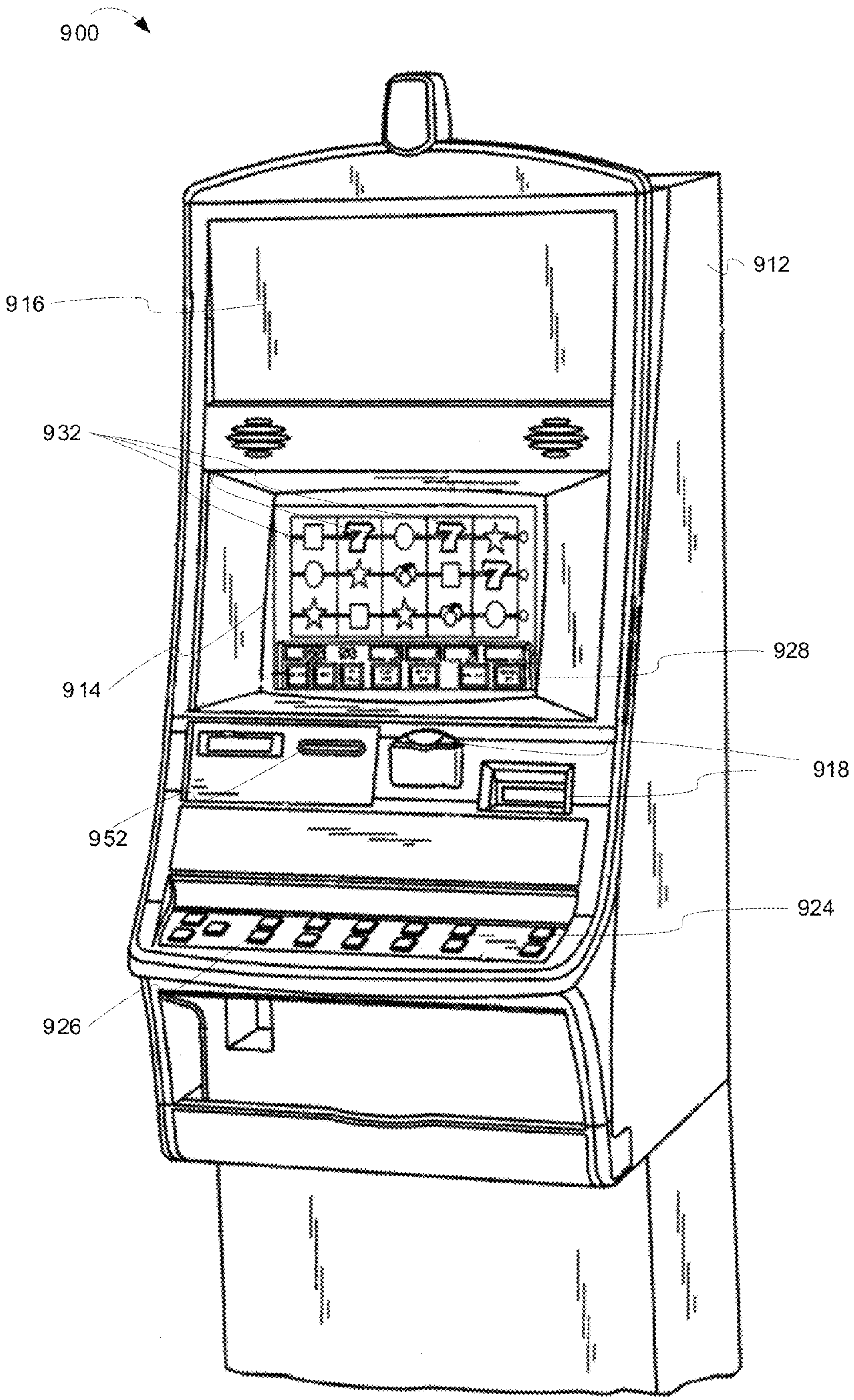
FIG. 9 is an illustration of a wagering game machine 900, according to some embodiments.

FIG. 9 is a conceptual diagram that illustrates an example of a wagering game machine 900, according to some embodiments. Referring to FIG. 9, the wagering game machine 900 can be used in gaming establishments, such as casinos. According to some embodiments, the wagering game machine 900 can be any type of wagering game machine and can have varying structures and methods of operation. For example, the wagering game machine 900 can be an electromechanical wagering game machine configured to play mechanical slots, or it can be an electronic wagering game machine configured to play video casino games, such as blackjack, slots, keno, poker, blackjack, roulette, etc.

The wagering game machine 900 comprises a housing 912 and includes input devices, including value input devices 918 and a player input device 924. For output, the wagering game machine 900 includes a primary display 914 for displaying information about a basic wagering game. The primary display 914 can also display information about a bonus wagering game and a progressive wagering game. The wagering game machine 900 also includes a secondary display 916 for displaying wagering game events, wagering game outcomes, and/or signage information. While some components of the wagering game machine 900 are described herein, numerous other elements can exist and can be used in any number or combination to create varying forms of the wagering game machine 900.

The value input devices 918 can take any suitable form and can be located on the front of the housing 912. The value input devices 918 can receive currency and/or credits inserted by a player. The value input devices 918 can include coin acceptors for receiving coin currency and bill acceptors for receiving paper currency. Furthermore, the value input devices 918 can include ticket readers or barcode scanners for reading information stored on vouchers, cards, or other tangible portable storage devices. The vouchers or cards can authorize access to central accounts, which can transfer money to the wagering game machine 900.

The player input device 924 comprises a plurality of push buttons on a button panel 926 for operating the wagering game machine 900. In addition, or alternatively, the player input device 924 can comprise a touch screen 928 mounted over the primary display 914 and/or secondary display 916.

The various components of the wagering game machine 900 can be connected directly to, or contained within, the housing 912. Alternatively, some of the wagering game machine's components can be located outside of the housing 912, while being communicatively coupled with the wagering game machine 900 using any suitable wired or wireless communication technology.

The operation of the basic wagering game can be displayed to the player on the primary display 914. The primary display 914 can also display a bonus game associated with the basic wagering game. The primary display 914 can include a cathode ray tube (CRT), a high resolution liquid crystal display (LCD), a plasma display, light emitting diodes (LEDs), or any other type of display suitable for use in the wagering game machine 900. Alternatively, the primary display 914 can include a number of mechanical reels to display the outcome. In FIG. 9, the wagering game machine 900 is an "upright" version in which the primary display 914 is oriented vertically relative to the player. Alternatively, the wagering game machine can be a "slant-top" version in which the primary display 914 is slanted at about a thirty-degree angle toward the player of the wagering game machine 900. In yet another embodiment, the wagering game machine 900 can exhibit any suitable form factor, such as a free standing model, bar top model, mobile handheld model, or workstation console model.

A player begins playing a basic wagering game by making a wager via the value input device 918. The player can initiate play by using the player input device's buttons or touch screen 928. The basic game can include arranging a plurality of symbols along a pay line 932, which indicates one or more outcomes of the basic game. Such outcomes can be randomly selected in response to player input. At least one of the outcomes, which can include any variation or combination of symbols, can trigger a bonus game.

In some embodiments, the wagering game machine 900 can also include an information reader 952, which can include a card reader, ticket reader, bar code scanner, RFID transceiver, or computer readable storage medium interface. In some embodiments, the information reader 952 can be used to award complimentary services, restore game assets, track player habits, etc.

Figure 10:
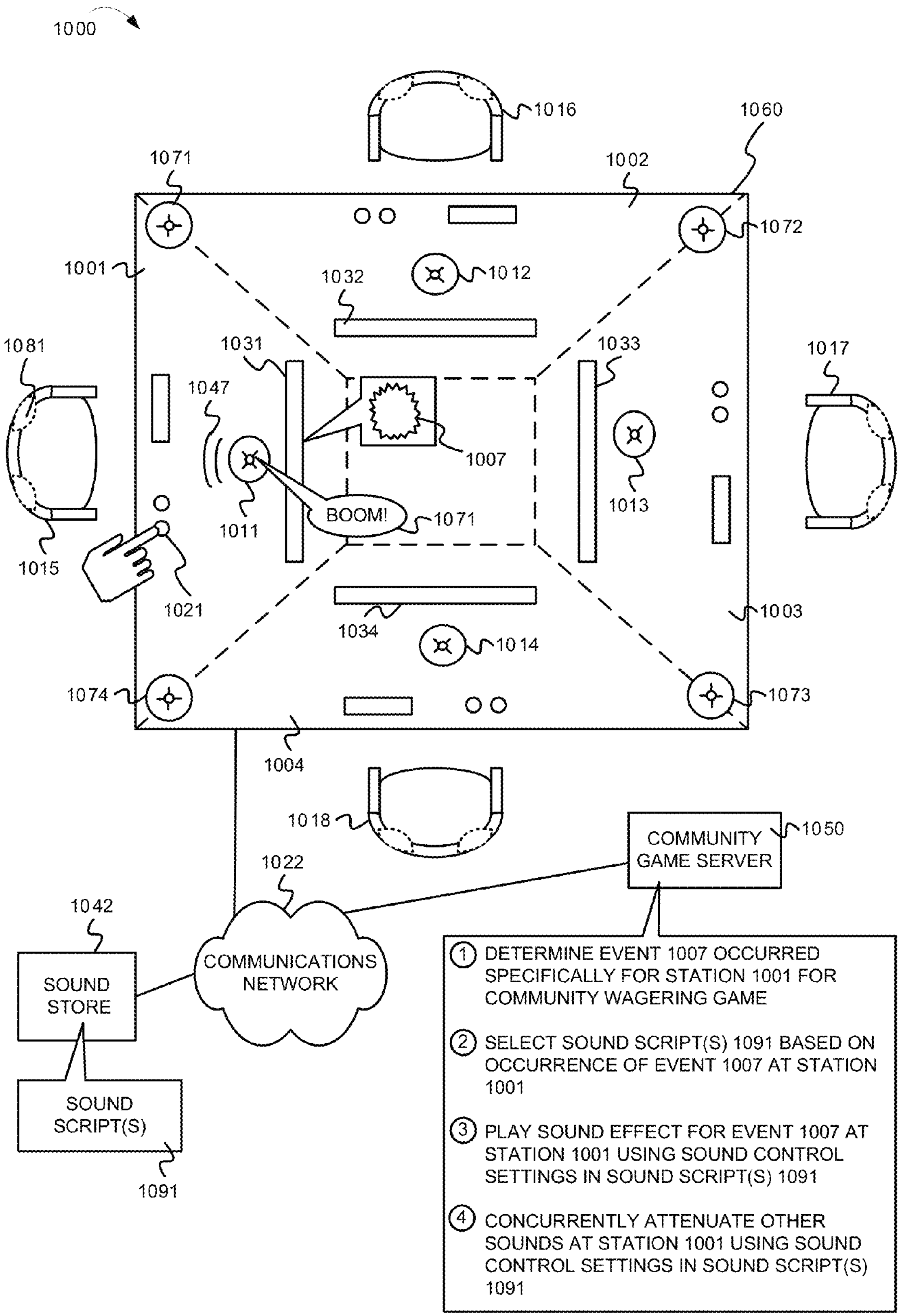
FIG. 10 is an illustration of a wagering game system 1000, according to some embodiments.
Figure 11A:
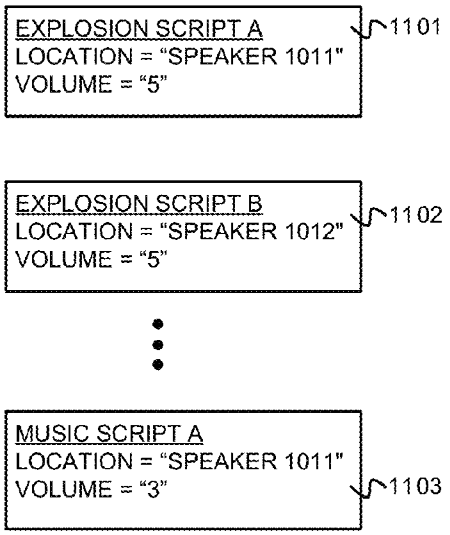
Figure 11B:
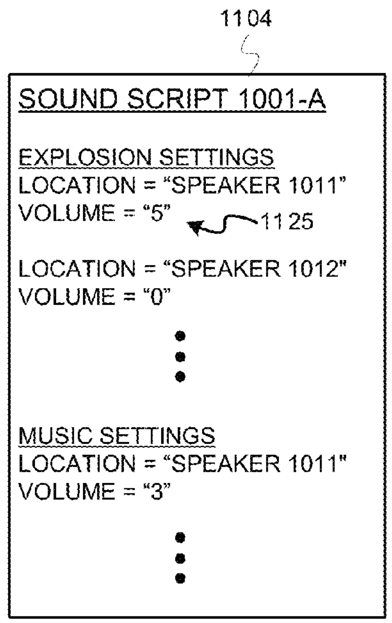
Figure 11C:
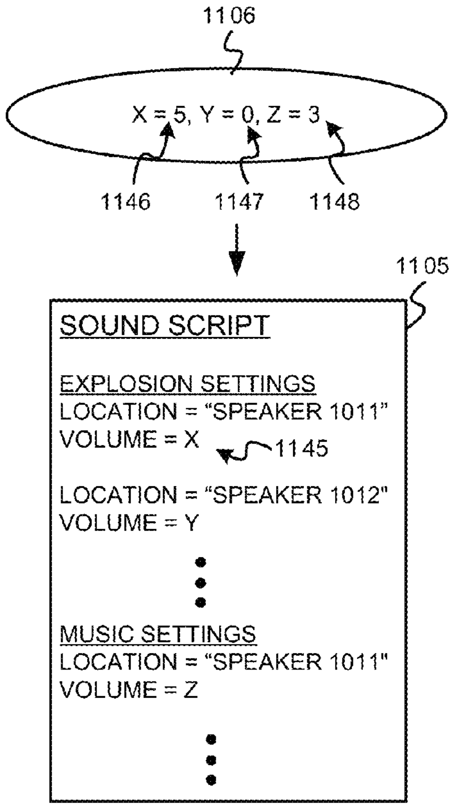
Figure 11D:
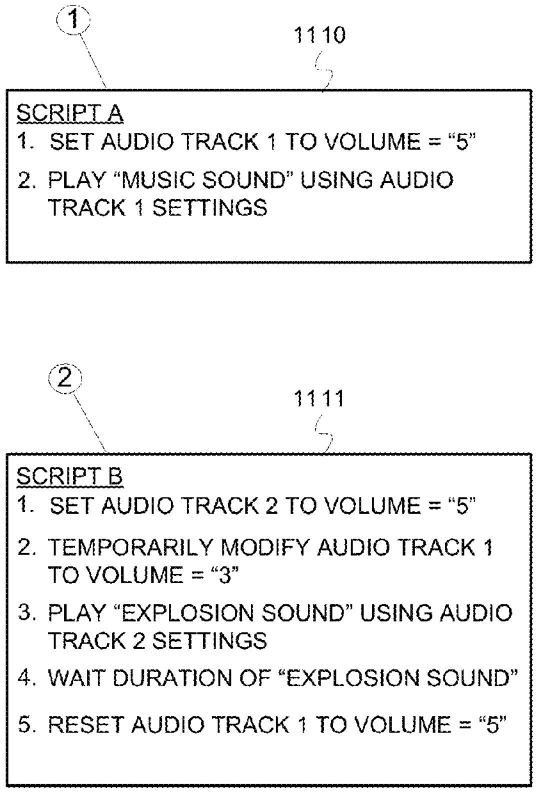

FIG. 10 is an illustration of a wagering game system 1000, according to some embodiments. In FIG. 10, the wagering game system ("system") 1000 includes a wagering game table 1060 (or an electronic gaming table, or e-table) connected to a community wagering game server ("community game server") 1050 via a communications network 1022. The community game server 1050 accesses a sound store 1042. In the embodiments shown in FIG. 10 the sound store 1042 is not in the community game server 1050. However, in some embodiments, the sound store 1042 is part of, or included within, the community game server 1050.

The wagering game table 1060 includes multiple player stations 1001, 1002, 1003, and 1004. Each player station may include one or more controls and devices (e.g., chairs 1015, 1016, 1017, 1018, speakers 1011, 1012, 1013, 1014, displays 1031, 1032, 1033, 1034, peripherals, etc.). The speakers 1011, 1012, 1013, 1014 produce audio respectively for the player stations 1001, 1002, 1003, 1004. In some embodiments, additional speakers 1071, 1072, 1073, 1074 may be positioned at each corner of the wagering game table 1060 instead of, or in addition to speakers 1011, 1012, 1013, 1014 that are centered, or nearly centered, at each of the player stations 1001, 1002, 1003, 1004. For instance, see FIG. 12 below for description of an alternative embodiment that positions speakers at corners of an e-table. Still referring to FIG. 10, however, the speakers 1011, 1012, 1013, 1014 produce sound directly at players that may be seated at any of the player stations 1001, 1002, 1003, and 1004. For example, the speaker 1011 directs a sound field 1047 directly at, or primarily toward, the chair 1015, or a player seated at the chair 1015, so that the sound field 1047 remains primarily focused to the vicinity of the player station 1001. For example, the speaker 1011 does not direct sound to any of the other player stations 1002, 1003, or 1004, although some sound may be overheard at the other player stations 1002, 1003, and 1004.

In some embodiments, a player at player station 1001 can play a primary, or "base," wagering game from a wagering game application. The primary wagering game is different from a secondary, or "bonus," game application. A secondary game application may be presented as a result of activity that occurs within the primary wagering game. The community game server 1050 may provide the community wagering game application as the secondary or bonus application. The primary wagering game application may be specific to only the player station 1001 (i.e., a wagering game controlled by a player at the player station 1001 and not controlled by any other player at any of the other player stations 1002, 1003, or 1004). For example, a player can play a slot application at the player station 1001. The player station 1001 can present the slot application at the display 1031. However, in some embodiments, a player can play the community wagering game with other players at the wagering game table 1060 (e.g., some or all of the player stations 1001, 1002, 1103, 1004 present the community wagering game on each of the monitors 1031, 1032, 1033, 1034). Each of the monitors 1031, 1032, 1033, 1034 can present a different perspective of the community wagering game to each of the respective player stations 1001, 1002, 1003, 1004. Each player at each of the stations 1001, 1002, 1003, 1004 may also have different identities (e.g., control different game characters, control different game objects, etc.) in the community wagering game. The wagering game application (e.g., slot game) and the community wagering game application can be separate and independent applications. For example, the community wagering game application may be a bonus wagering game application that launches and runs independent of individual wagering game applications running at any of the player stations 1001, 1002, 1003, or 1004. In some embodiments, each of the player stations 1001, 1002, 1003, and 1004 may be considered separate wagering game machines that are consolidated into the wagering game table 1060. Any of the player stations 1001, 1002, 1003, 1004, therefore, may include separate processors, separate memory stores, separate hardware, etc. In other embodiments, the wagering game table 1060 may have a single processor that controls all four player stations 1001, 1002, 1003, and 1004.

The community game server 1050 can control content in the community wagering game that is relevant to all player stations 1001, 1002, 1003, 1004 and can also control content in the same community wagering game that it relevant to only the player station 1001. For example, in the community game one of the players, such as a player associated with player station 1001, may perform an action (e.g., perform wagering or other game activity using control 1021) that causes an event 1007 to occur within the community wagering game. In some embodiments, the event 1007 is triggered by player input from the player station 1001, and not by player input from any of the other player stations 1002, 1003, 1004. In other embodiments, however, the event 1007 may relate only to the player station, even if the event 1007 is caused or triggered by input from group game activity or from additional player input from the other stations 1002, 1003, and 1004. As a result, the event 1007 for, or about, the player station 1001 may be referred to as a location-specific, or station-specific, event that is specific to (e.g., only relates to) the player station 1001, and for which only a player at the player station 1001 would be interested in hearing the sound effect for the station-specific event. For instance, one game character or actor may be assigned to a player account associated with the player station 1001. The one game character or actor may be controlled by the player seated at the player station 1001. The one game character or actor may perform activities within the community wagering game that are different from other characters or actors from other player accounts at the other player stations 1002, 1003, and 1004. The one game character or actor may trigger the event 1007 in the community wagering game application that is specific the player station 1001. The event may be, for example, an explosion effect that occurs in the community wagering game, but is specific for the player station 1001. As a result, a player at the player station 1001 would be interested in hearing a sound effect 1071 of the event 1007, but other players at the other player stations 1002, 1003, and 1004 would not be interested in hearing the sound effect 1071 (e.g., an explosion sound) for the event 1007. Thus, the community game server 1050 recognizes that the station-specific event 1007 is specific only for the player station 1001. The community game server 1050 selects a sound script(s) 1091 that plays a sound for the event 1007 so that the audio field 1047, which presents the sound effect 1071, is primarily directed toward the chair 1015 or a player seated in the chair 1015 (e.g., only comes from the speaker 1011). The sound script(s) 1091, or audio playlist, references sound files for sound effects, including a reference to the sound effect 1071 (e.g., explosion sounds) for the event 1007, and includes scripting that defines characteristics or settings of the sound effects 1071 (e.g., settings that define volume levels, treble levels, bass levels, audio balance levels, panning levels, etc.). The scripting may be one or many different types of scripting languages, such as XML, JavaScript, a proprietary script, etc. The sound script(s) 1091 may be a configuration file (e.g., an XML file, a txt file, etc.), a web file (e.g., a hypertext markup language (HTML) document), etc. In some embodiments, the sound script(s) 1091 is a setting, or record, in a database. In some embodiments, sound script(s) 1091 is stored on a machine-readable storage medium (e.g., stored in a memory location, stored on a disk, etc.).

In some embodiments, the sound script(s) 1091 includes scripting instructions that only play sound for the speaker 1011. For example, in FIG. 11A, one script 1101 includes sound control settings (e.g., sound balance settings, sound volume settings, sound panning settings, etc.) only for the speaker 1011 for the event 1007, and not for any other speaker at the wagering game table 1060. The system 1000 can select the script 1101 when it needs to play a sound component for the event 1007 at only the speaker 1101. A second, separate, script 1102 may include a volume setting for only the speaker 1012 if the system 1000 needed to play a sound effect at speaker 1012. A third script 1103 may include sound control instructions and/or settings to modify (e.g., reduce, attenuate, etc.) other types of sounds on the speaker 1011 (e.g., includes a volume setting to lower volume of background music at speaker 1011 from a default volume level to a lower volume level) while concurrently, simultaneously, etc. the sound effect 1071 for the event 1007 plays on the speaker 1011.

In other embodiments, instead of selecting one script that includes sound control instructions and/or settings for only the player station 1001, the community game server 1050 may use a single script that includes sound control settings for all speakers 1011, 1012, 1013, and 1014. For example, in FIG. 11B, a script 1104 includes sound control settings for multiple types of sounds effects including explosion sounds for the event 1007 and other sounds (e.g., music soundtrack, character voices, etc.). The system 1000 can use the script 1104 to play sounds on all channels or audio tracks, for each of the speakers 1011, 1012, 1013 and 1014. However, one sound control setting, such as volume setting 1125, for the speaker 1011, has a positive volume level, whereas volume settings for the speakers 1012, 1013, and 1014 have zero volume levels or volume levels that are lower than a volume level for the speaker 1011. The system 1000, therefore, can select the script 1104 when it needs to play the sound effect 1071 for the event 1007 at the player station 1001. The script 1104 can include instructions and/or settings that attenuate or lower volume of background music or other sounds at speaker 1011 while concurrently, simultaneously, etc. playing the sound effect 1071 for the event 1007 on the speaker 1011. In other embodiments, the script 1104 may include panning or balance instructions, such as "PAN=RIGHT 100%" and "BALANCE=FORWARD 100%" instead of specifying a specific speaker or a volume setting. Thus, by changing balance and panning, the script 1104 can adjust the directionality or the placement of the audio for a specific speaker (e.g., the speaker 1011 at a position at the wagering game table 1060 that equates to a combination of full pan right and a full balance forward), creating a sound effect that causes a volume level to be high at the corresponding player station (e.g., at player station 1001) and low, or non-existent, at other player stations.

In yet other embodiments, the community game server 1050 may generate or detect parameter values for sound settings and pass the parameter values into the sound script(s) 1091 as parameters. For example in FIG. 11C, a script 1105, similar to script 1104, includes variables that represent volume values instead of constant volume values (e.g., variable 1145 indicates a variable volume value for the speaker 1011 for the event 1007). In some embodiments, the community game server 1050 can generate parameter values 1106 based on information provided from the wagering game table 1060 (e.g., via computer(s) and/or processor(s) associated with the player stations 1001, 1002, 1003, 1004, via a computer that controls activities at the wagering game table 1060, etc.). In other embodiments, the community game server 1050 produces the parameter values 1106 based on information that occurs in the community wagering game. In other embodiments, the community game server 1050 may receive the parameter values from other devices. The parameter values 1106 may include sound control values for all audio tracks for all of the speakers at the wagering game table 1060 (e.g., a first volume value 1146 indicates a volume level value for the speaker 1011, a second volume value 1147 indicates a volume level value for the speaker 1012, a third volume value 1148 indicates a volume level value for background music for the speaker 1011, etc.). The system 1000 can provide (e.g., pass, insert, include, etc.) any of the volume values as parameters to the script 1105 (e.g., pass the volume value 1146 to the variable 1145 via one or more programming instructions).

In some embodiments, the system 1000 can play a station-specific sound and modify background sound settings for the specific station using a group of scripts that change audio track sound settings and play sounds according to the audio track sound settings. For example, in FIG. 11D, the system 1000 can use the sound script 1110 at stage "1" to set AUDIO TRACK 1 to a volume level of "5." The sound script 1110 also plays a "MUSIC SOUND" sound file(s) at the volume level of "5." After stage "1," (i.e., at stage "2"), the system 1000 detects the event 1007. The system 1000 then selects the script 1111, which initially sets AUDIO TRACK 2 to a volume level of "5" and then modifies the sound volume settings of AUDIO TRACK 1, which was initially set to volume level "5" by the script 1110 for the MUSIC SOUND file(s), to a lower volume setting (i.e., modifies AUDIO TRACK 1 to volume setting "3"). The system 1000 can then play the "EXPLOSION SOUND" file using the AUDIO TRACK 2 volume setting of "5" while the MUSIC SOUND file(s) play at volume "3" via AUDIO TRACK 1. The system 100 can then wait a known duration that equates to an amount of time required to play the EXPLOSION SOUND file. Then, after the known duration (i.e., at approximately the moment when the EXPLOSION SOUND file stops playing), the system 1000 resets the AUDIO TRACK 1 volume to "5" so that the MUSIC SOUND file(s) can resume playing at the higher volume level "5."

Returning to FIG. 10, in some embodiments, where the wagering game table 1060 includes speakers at its corners (e.g., speakers 1071, 1072, 1073, 1074), or in other configurations where the player station 1001 may share speakers, or have speakers in common with any adjacent player stations (e.g., player stations 1002 or 1004), the sound script(s) 1091 can include volume level settings that may play sound for two speakers (e.g., speakers 1071 and 1074) that relate to the player station 1001. Some of the sound would be heard at the adjacent player stations (e.g., player stations 1002 or 1004), however, most of the sound would be directed to the player station 1001. In other words audio fields may be produced from the speakers 1071 and 1074 that are directed toward, focused at, or intended for three of the player stations 1001, 1002, and 1004. If, however, the system 1000 provides that same sound (e.g., the sound effect 1071) from the speakers 1071 and 1074, the player station 1001 receives sound from both of the speakers 1071 and 1074, and the player stations 1004 and 1002 only receive sound from one speaker assigned to each of those player stations (i.e., only one speaker assigned to player station 1002 or 1004), then a sound field for the event 1007 at player station 1001 is louder (e.g., twice as loud) as any sound fields for the event 1007 at either of the player stations 1002 or 1004. The script(s) 1091, therefore, could include volume instructions for speakers 1071 and 1074 to play sound for the event 1007, but the script would not include instructions to play sound at speakers 1072 and 1073 or the script would have instructions for zero, or very reduced, volume levels at speakers 1072 and 1073 for the sound effect 1071 of the event 1007.

In other embodiments, the wagering game table 1060 may include seating configurations and/or shapes that are different from those shown in FIG. 10, for example, FIG. 12 illustrates another example wagering game table 1260 with a rectangular shape and two player stations may be situated at each of the long sides of the rectangle shape. Speakers may be centered at each station at the rectangular table, at corners of the rectangular table (e.g., speaker 1211 is at a corner of the wagering game table 1060 associated with a player station 1201), or in other locations. Other embodiments may include triangular shapes, circular shapes, oval shapes, irregular shaped, combinations of shapes, etc. In some embodiments, speakers at the wagering game table 1260 may be shared or common between player stations and may direct sound to more than one player station. (e.g., directed to two stations instead of only one station). In other embodiments, however, speakers at the wagering game table 1260 are specifically assigned to a player station, which direct sounds primarily to the player station to which they are specifically assigned. For example, in FIG. 12, the speaker 1211 produces a directed sound field 1247 of a station specific sound 1271, for a station specific event 1207, primarily to the station 1201. Further, some embodiments of the wagering game table 1260 may include four display areas within a single piece of display hardware, or may include a single shared display for all player stations.

Returning to FIG. 10, in some embodiments, the wagering game table 1060 has speakers embedded or attached to a framing, or structure, of the wagering game table 1060, such as speakers 1011, 1012, 1013, 1014, or speakers 1071, 1072, 1073, and 1074. In other embodiments, however, the wagering game table 1060 may have one or more speakers in peripheral device or in locations other than, or in addition to, speakers that may be embedded or attached to a the framing or structure of the wagering game table 1060. For example, the chairs may have speakers (e.g., speakers 1081). In another embodiment, a player may wear headphones or an earpiece instead of, or in addition to, speakers 1011, 1012, 1013, 1014, or speakers 1071, 1072, 1073, 1074. The community game server 1050 can feed sound, using the sound script(s) 1091, to any of the additional speakers, headsets, etc. In some embodiments, the community game server 1050 may include separate scripts for each of the additional speakers, headsets, etc. or may include instructions in one script that controls volume levels to each of the additional speakers, headsets, etc. Consequently, the sound effect 1071 for the event 1007 can be directed to the player station 1001, but the volume levels for the additional speakers, headsets, etc. at the player station 1001 can have different volume levels. For instance, the script(s) 1091 may send more sound volume for player station specific sounds to the speakers 1081 or to a headset, and provide no or little sound volume to the speaker 1011 or speakers 1071, 1074, which are shared or common speakers with other player stations (e.g., with player stations 1002 and 1004).

Further, in some embodiments, the system 1000 can further synchronize or modify base game sounds from a base game, such as a slot game being played at the player station 1001 concurrently, simultaneously, etc. with the sound effect 1071 for the event 1007 at the player station 1001. For example, the system 1000 can attenuate base game sounds at the same time that the sound effect 1071 plays for the event 1007.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product, or software, that may include a machine-readable storage medium having stored thereon instructions, which may be used to program a computer system (or other electronic device(s)) to perform a process according to embodiments(s), whether presently described or not, because every conceivable variation is not enumerated herein. A machine-readable storage medium includes any mechanism that stores information in a form readable by a machine (e.g., a wagering game machine, computer, etc.). For example, machine-readable storage media includes read only memory (ROM), random access memory (RAM), magnetic disk storage media, optical storage media (e.g., CD-ROM), flash memory machines, erasable programmable memory (e.g., EPROM and EEPROM); etc. Some embodiments of the invention can also include machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method comprising:

activating a plurality of sound files from a plurality of independent gaming applications on a wagering game machine during a wagering game session, wherein the plurality of sound files play concurrently on speakers associated with the wagering game machine, wherein the plurality of independent gaming applications utilize a plurality of audio playlists to control presentation of the plurality of sound files for each of the independent gaming applications;

determining sound classes associated with the plurality of sound files, wherein the sound classes are stored in the plurality of audio playlists;

determining, from prioritization rules, priority values for the sound classes;

ascertaining, based on the priority values, a prioritized relationship between the sound classes;

generating sound balancing priorities for the plurality of sound files played by the plurality of audio playlists based on the prioritized relationship; and dynamically balancing the presentation of the plurality of the sound files for the plurality of audio playlists based on the sound balancing priorities.

2. The computer-implemented method of claim 1, wherein ascertaining, based on the priority values, the prioritized relationship between the sound classes includes determining application activity that occurs for the plurality of independent gaming applications, determining that the plurality of audio playlists are associated with the application activity, determining, from the plurality of audio playlists, that the plurality of sound files are related to the application activity, determining, from the plurality of audio playlists, that the sound classes are associated with the plurality of sound files, determining, from the prioritization rules, activity indicators that describe the application activity, determining, from the prioritization rules, that the priority values are associated with the activity indicators, comparing the priority values, and determining, based on the comparing the priority values, that one of the priority values has a higher value for the application activity at a given time.

3. The computer-implemented method of claim 1, wherein the plurality of independent gaming applications are one or more of wagering game applications controlled by the wagering game machine, wagering game server-side applications controlled by a wagering game server, and network applications controlled by a casino network application controller.

4. The computer-implemented method of claim 1 further comprising:

combining sound content data and sound classification data from the plurality of audio playlists into a categorized submix of sound content;

generating priority commands based on the sound balancing priorities;

storing the priority commands in a system audio playlist; and controlling sound production devices on the wagering game machine with the system audio playlist.

5. The computer-implemented method of claim 1, wherein dynamically balancing the presentation of the plurality of the sound files for the plurality of audio playlists based on the sound balancing priorities comprises, determining a first sound effect for one application, determining a first sound class for the first sound effect, determining a second sound effect for a second application, wherein the second sound effect is activated contemporaneously with the first sound effect, determining a second sound class for the second sound effect, determining that a first priority value for the first sound class is higher than a second priority value for the second sound class, and modifying sound characteristics for one or more of the first sound effect and the second sound effect so that the first sound effect has an audible prevalence to the second sound effect.

6. The computer-implemented method of claim 1, wherein the sound classes comprise one or more of types of wagering game specific classifications, types of applications, types of individual sounds produced by an application, types of technology, types of manufacturers, types of subject matter, types of game genres, and types of network events.

7. The computer-implemented method of claim 1, wherein one application from the plurality of independent gaming applications lacks classification data, and further comprising:

automatically assigning a sound classification to the one application.

8. The computer-implemented method of claim 7 further comprising:

determining identifying information about the one application; and assigning the sound classification according to the identifying information.

9. One or more non-transitory machine-readable storage media having instructions stored thereon, which when executed by a set of one or more processors causes the set of one or more processors to perform operations comprising:

activating a plurality of sound files from a plurality of independent gaming applications on a wagering game machine during a wagering game session, wherein the plurality of sound files play concurrently on speakers associated with the wagering game machine, wherein the plurality of independent gaming applications utilize a plurality of audio playlists to control presentation of the plurality of sound files for each of the independent gaming applications;

determining sound classes associated with the plurality of sound files, wherein the sound classes are stored in the plurality of audio playlists;

determining, from prioritization rules, priority values for the sound classes;

ascertaining, based on the priority values, a prioritized relationship between the sound classes;

generating sound balancing priorities for the plurality of sound files played by the plurality of audio playlists based on the prioritized relationship; and dynamically balancing the presentation of the plurality of the sound files for the plurality of audio playlists based on the sound balancing priorities.

10. The one or more non-transitory machine-readable storage media of claim 9, wherein the operation of ascertaining, based on the priority values, the prioritized relationship between the sound classes includes operations comprising determining application activity that occurs for the plurality of independent gaming applications, determining that the plurality of audio playlists are associated with the application activity, determining, from the plurality of audio playlists, that the plurality of sound files are related to the application activity, determining, from the plurality of audio playlists, that the sound classes are associated with the plurality of sound files, determining, from the prioritization rules, activity indicators that describe the application activity, determining, from the prioritization rules, that the priority values are associated with the activity indicators, comparing the priority values, and determining, based on the comparing the priority values, that one of the priority values has a higher value for the application activity at a given time.

11. The one or more non-transitory machine-readable storage media of claim 9, wherein the plurality of independent gaming applications are one or more of wagering game applications controlled by the wagering game machine, wagering game server-side applications controlled by a wagering game server, and network applications controlled by a casino network application controller.

12. The one or more non-transitory machine-readable storage media of claim 9, said operations further comprising:

combining sound content data and sound classification data from the plurality of audio playlists into a categorized submix of sound content;

generating priority commands based on the sound balancing priorities;

storing the priority commands in a system audio playlist; and controlling sound production devices on the wagering game machine with the system audio playlist.

13. The one or more non-transitory machine-readable storage media of claim 9, wherein the operation of dynamically balancing the presentation of the plurality of the sound files for the plurality of audio playlists based on the sound balancing priorities includes operations comprises, determining a first sound effect for one application, determining a first sound class for the first sound effect, determining a second sound effect for a second application, wherein the second sound effect is activated contemporaneously with the first sound effect, determining a second sound class for the second sound effect, determining that a first priority value for the first sound class is higher than a second priority value for the second sound class, and modifying sound characteristics for one or more of the first sound effect and the second sound effect so that the first sound effect has an audible prevalence to the second sound effect.

14. The one or more non-transitory machine-readable storage media of claim 9, wherein the sound classes comprise one or more of types of wagering game specific classifications, types of applications, types of individual sounds produced by an application, types of technology, types of manufacturers, types of subject matter, types of game genres, and types of network events.

15. The one or more non-transitory machine-readable storage media of claim 9, wherein one application from the plurality of independent gaming applications lacks classification data, and said operations further comprising:

automatically assigning a sound classification to the one application.

16. The one or more non-transitory machine-readable storage media of claim 15, said operations further comprising:

determining identifying information about the one application; and assigning the sound classification according to the identifying information.

17. A system comprising:

one or more processors; and one or more memory storage devices configured to store instructions, which when executed by at least one of the one or more processors cause the system to perform operations to activate a plurality of sound files from a plurality of independent gaming applications on a wagering game machine during a wagering game session, wherein the plurality of sound files play concurrently on speakers associated with the wagering game machine, wherein the plurality of independent gaming applications utilize a plurality of audio playlists to control presentation of the plurality of sound files for each of the independent gaming applications;

determine sound classes associated with the plurality of sound files, wherein the sound classes are stored in the plurality of audio playlists;

determine, from prioritization rules, priority values for the sound classes;

ascertain, based on the priority values, a prioritized relationship between the sound classes;

generate sound balancing priorities for the plurality of sound files played by the plurality of audio playlists based on the prioritized relationship; and dynamically balance the presentation of the plurality of the sound files for the plurality of audio playlists based on the sound balancing priorities.

18. The system of claim 17, wherein the operation to ascertain, based on the priority values, the prioritized relationship between the sound classes includes operations to determine application activity that occurs for the plurality of independent gaming applications, determine that the plurality of audio playlists are associated with the application activity, determine, from the plurality of audio playlists, that the plurality of sound files are related to the application activity, determine, from the plurality of audio playlists, that the sound classes are associated with the plurality of sound files, determine, from the prioritization rules, activity indicators that describe the application activity, determine, from the prioritization rules, that the priority values are associated with the activity indicators, compare the priority values, and determine, based on the comparing the priority values, that one of the priority values has a higher value for the application activity at a given time.

19. The system of claim 17, wherein the plurality of independent gaming applications are one or more of wagering game applications controlled by the wagering game machine, wagering game server-side applications controlled by a wagering game server, and network applications controlled by a casino network application controller.

20. The system of claim 17, wherein the one or more memory storage devices are configured to store instructions, which when executed by at least one of the one or more processors cause the system to further perform operations to:

combine sound content data and sound classification data from the plurality of audio playlists into a categorized submix of sound content;

generate priority commands based on the sound balancing priorities;

store the priority commands in a system audio playlist; and control sound production devices on the wagering game machine with the system audio playlist.

21. The system of claim 17, wherein the operation to dynamically balance the presentation of the plurality of the sound files for the plurality of audio playlists based on the sound balancing priorities includes operations to, determine a first sound effect for one application, determine a first sound class for the first sound effect, determine a second sound effect for a second application, wherein the second sound effect is activated contemporaneously with the first sound effect, determine a second sound class for the second sound effect, determine that a first priority value for the first sound class is higher than a second priority value for the second sound class, and modify sound characteristics for one or more of the first sound effect and the second sound effect so that the first sound effect has an audible prevalence to the second sound effect.

22. The system of claim 17, wherein the sound classes comprise one or more of types of wagering game specific classifications, types of applications, types of individual sounds produced by an application, types of technology, types of manufacturers, types of subject matter, types of game genres, and types of network events.

23. The system of claim 17, wherein one application from the plurality of independent gaming applications lacks classification data, and wherein the one or more memory storage devices are configured to store instructions, which when executed by at least one of the one or more processors cause the system to further perform operations to:

automatically assign a sound classification to the one application.

24. The system of claim 23, wherein the one or more memory storage devices are configured to store instructions, which when executed by at least one of the one or more processors cause the system to further perform operations to:

determine identifying information about the one application; and assign the sound classification according to the identifying information.

* * * * *